United States Patent [19]
Nagasaki et al.

[11] Patent Number: 6,127,760
[45] Date of Patent: Oct. 3, 2000

[54] DIRECT-CURRENT MOTOR

[75] Inventors: Yasumasa Nagasaki, Konan; Hideo Hotta, Seto; Kazuo Kitamura, Owariasahi, all of Japan

[73] Assignee: Kabushiki Kaisha Toshiba, Kanagawa-ken, Japan

[21] Appl. No.: 09/065,543

[22] Filed: Apr. 24, 1998

[30] Foreign Application Priority Data

Apr. 24, 1997 [JP] Japan .................................. 9-107615

[51] Int. Cl.$^7$ ....................................................... H02K 1/12
[52] U.S. Cl. .......................... 310/254; 310/216; 310/258; 310/269
[58] Field of Search .............................. 310/43, 177, 218, 310/254, 193, 261, 264, 269; 29/596, 598

[56] References Cited

U.S. PATENT DOCUMENTS

| | | | |
|---|---|---|---|
| 2,501,232 | 3/1950 | Mesh | 310/269 |
| 5,323,074 | 6/1994 | Sakashita et al. | 310/43 |
| 5,508,578 | 4/1996 | Suzuki et al. | 310/254 |
| 5,705,871 | 1/1998 | Suzuki et al. | 310/156 |

*Primary Examiner*—Nestor Ramirez
*Assistant Examiner*—Tran N Nguyen
*Attorney, Agent, or Firm*—Pillsbury Madison & Sutro LLP

[57] ABSTRACT

A direct-current motor includes a core including a plurality of teeth arranged in a circular disposition so as to define a plurality of slots, the teeth having distal ends and coil-winding sections respectively, coils wound on the coil-winding sections of the teeth respectively, and pole sections each of which is provided at a distal end side of the corresponding tooth and is circumferentially wider than the corresponding coil-winding section. In the motor, the teeth include first teeth having wider pole sections respectively and second teeth having pole sections narrower than the first teeth. Notches are formed in circumferential corners of the pole sections of the first teeth or members substantially integral with the pole sections of the first teeth respectively.

26 Claims, 22 Drawing Sheets

DIRECT-CURRENT MOTOR

BACKGROUND OF THE INVENTION

1. Field of the Invention

This invention relates to a direct-current motor having an armature including a yoke, a plurality of teeth integrally extending from the yoke in a circular disposition so as to define a plurality of slots, and coils wound on the respective teeth.

2. Description of the Prior Art

An armature for a conventional direct-current (DC) motor, for example, a stator for a three-phase brushless DC motor of the outer rotor type, has a stator core including a yoke and a number of teeth integrally extending from the yoke in a circular disposition so as to define a number of slots and provided with respective coils wound thereon. A distal end opening of each slot is half-closed so that each slot is formed into a semienclosed slot. Consequently, a variation of permeance between the stator core and a rotor in a direction of rotation of the rotor or in the circumferential direction is reduced such that a cogging torque which is substantially a torque variation can be reduced.

In another conventional DC motor, the teeth have two alternately different circumferential widths at the respective distal ends thereof. In this construction, the semienclosed slots have alternately different circumferential pitches at the centers of the openings thereof. The randomicity of the circumferential pitches reduces the variations of permeance. This effectively reduces the cogging torque.

An automatic winding machine is usually used to wind coils on the respective teeth of the stator core for the DC motor. Guide members referred to as "formers" are reciprocally moved lengthwise with respect to each tooth so that a wire, namely, a magnet wire is guided to be moved for every one turn pitch. Thus, each coil is formed into a predetermined shape.

SUMMARY OF THE INVENTION

A primary object of the present invention is to provide a DC motor which comprises a plurality of teeth each having a coil-winding section and a pole section located at the distal end of the tooth, the teeth integrally extending from the yoke in the circular disposition and including first teeth having respective wide pole sections and second teeth having respective narrow pole sections, and which has such a structure that the winding machine can readily be applied thereto for winding the coils on the respective teeth so that an efficient coil winding operation is carried out.

Another object of the invention is to provide a DC motor in which an increase in the size thereof due to the disposition of a position detecting element for detecting a rotational position of a rotor can be prevented.

Further another object of the invention is to provide a DC motor which can develop well balanced torque and produces low levels of oscillation and noise.

The present invention provides a direct-current motor comprising a core including a plurality of teeth arranged in a circular disposition so as to define a plurality of slots, the teeth having distal ends and coil-winding sections respectively, coils wound on the coil-winding sections of the teeth respectively, and pole sections each of which is provided at a distal end side of the corresponding tooth and is circumferentially wider than the corresponding coil-winding section. In the direct-current motor, the teeth include first teeth having wider pole sections respectively and second teeth having pole sections narrower than the first teeth. Notches are formed in circumferential corners of the pole sections of the first teeth respectively.

According to the above-described motor, the plurality of teeth including the pole sections with the two different widths respectively are circumferentially arranged. As a result, since the variations in the permeance between a rotor and the stator are reduced, the cogging torque can effectively be reduced. Furthermore, since the notches are formed in the circumferential corners of the pole sections of the first teeth respectively, the guide protrusions of the winding machine can be used for winding the coils on the first and second teeth.

The invention also provides a direct-current motor comprising a core including a plurality of teeth arranged in a circular disposition so as to define a plurality of slots, the teeth having distal ends and coil-winding sections respectively, slot insulating members disposed so as to cover outer peripheries of the teeth respectively, coils wound on the coil-winding sections of the teeth with the slot insulating members being interposed therebetween, respectively, and pole sections each of which is provided at a distal end side of the corresponding tooth and is circumferentially wider than the corresponding coil-winding sections. In this construction, the teeth include first teeth having wider pole sections respectively and second teeth having pole sections narrower than the first teeth, and the slot insulating members have notches in portions thereof located at circumferential corners of the pole sections of the first teeth respectively.

In a preferred form, the coils are wound on the first and second teeth by a winding machine provided with guide protrusions reciprocally movable lengthwise with respect to each tooth to thereby guide the first and second teeth to a location where a coil forming magnet wire is wound thereon, and each notch has such a shape as to receive therein the corresponding guide protrusion at a reversing position thereof.

In another preferred form, the first and second teeth have outer peripheries covered with slot insulating members respectively, and the notches are formed in portions of the slot insulating members of each first tooth, the portions corresponding to all the corners located at both circumferential ends of each pole section respectively. As a result, the shapes of the slot insulating members are balanced and the wound coils are rendered stable by four ridges of each tooth.

In further another preferred form, a portion of the pole section of each first tooth excluding the notches has a circumferential width approximately equal to a width of the pole section of each second tooth. The magnet wire can be guided by the guide protrusions to the second teeth as well as to the first teeth.

In further another preferred form, each notch has a circumferential width equal to or larger than a circumferential dimension of each guide protrusion, and each notch has an axial depth five times or more as large as a wire diameter of each coil. Furthermore, each notch has an axial depth one half or more of a thickness of the coil wound on each first tooth. Consequently, the coils can stably be wound on the respective teeth when one or more of the above-described arrangements are employed.

In further another preferred form, a position detecting element is provided in one of the notches of one of the first teeth, and the coil wound on said one first tooth has a smaller number of turns than the other coils. Since the position detecting element is disposed in the notch which is unnecessary after the winding of the coils, the size of the motor can be prevented from being increased by the provision of the position detecting element.

In further another preferred form, the coils are wound the same number of turns on said one first tooth provided with the position detecting element and another first tooth belonging to the same phase as said one first tooth and disposed approximately symmetrically with said one first tooth, respectively. Consequently, the magnetic unbalance due to the provision of the position detecting element in the notch at the side of the pole section can be reduced such that an increase in the torque variations can be reduced.

In further another preferred form, said one first tooth provided with the position detecting element at least in one phase and the other teeth in said one phase are set at a larger number of turns so that a total number of turns in said one phase is equal to a total number of turns in each of the other phases. In this form, the magnetic unbalance can also be reduced.

In further another preferred form, at least one tooth has a smaller number of turns of the coil than the other teeth, said at least one tooth belonging to a phase differing from a phase to which said one first tooth provided with the position detecting element belongs, said at least one tooth being disposed approximately symmetrically with said one first tooth provided with the position detecting element. The magnetic unbalance can also be reduced in this form.

In further another preferred form, the teeth include the first or second teeth each of which belongs to a phase differing from a phase of the first tooth provided with the position detecting element and each of which has a smaller number of turns of the coil than the first tooth provided with the position detecting element, said first or second teeth being disposed approximately symmetrically with each other in each phase. The magnetic unbalance can also be reduced in this form.

In an eleventh preferred form, the coils disposed approximately symmetrically in each phase and each having the smaller number of turns than the other teeth have the respective numbers of turns approximately equal to the number of turns of the coils wound on the first tooth provided with the position detecting element.

BRIEF DESCRIPTION OF THE DRAWINGS

Other objects, features and advantages of the present invention will become clear upon reviewing the following description of preferred embodiments thereof, made with reference to the accompanying drawings, in which.

DETAILED DESCRIPTION OF THE PREFERRED EMBODIMENTS

Figure 1:
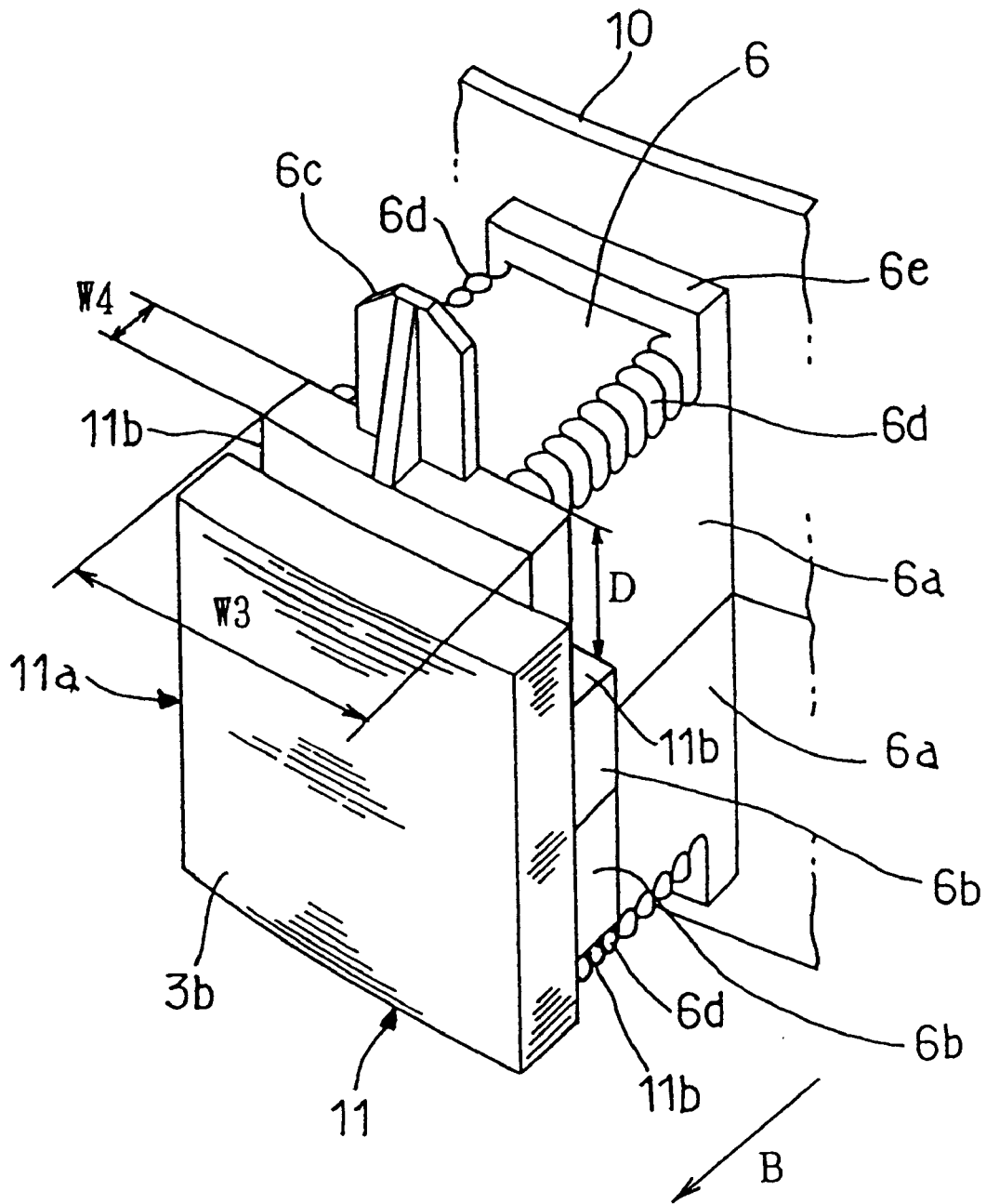
FIG. 1 is an enlarged perspective view of a first tooth of the stator core employed in the DC motor of a first embodiment in accordance with the present invention.

A first embodiment of the present invention will be described with reference to FIGS. 1 to 18. In the embodiment, the invention is applied to a three-phase 24 pole 36 slot brushless DC motor of the outer rotor type for rotating a pulsator and a wash tub of a full automatic washing machine. Referring first to FIG. 4, a stator core 1 for the brushless DC motor is shown. The stator core 1 is formed by stacking a plurality of steel sheets. The stator core 1 includes a generally cylindrical inner yoke 2, eighteen first teeth 3 radially extending from the inner yoke 2 and eighteen second teeth 4 radially extending from the inner yoke 2. The first and second teeth 3 and 4 are disposed alternately at an equal pitch (=10 degrees) circumferentially with respect to the stator.

Each of the first teeth 3 comprises a generally square coil-winding section 3a and a tooth end. The tooth end serves as a rectangular pole section 3b circumferentially projecting from both circumferential faces in the vicinity of the distal end of the coil-winding section 3a. Each pole section 3b has a circumferential width (hereinafter, "width") set at W1b. The width W1b of each pole section 3b and a width W1a of each coil-winding section 3a are set as W1b>W1a under a predetermined ratio.

Each of the second teeth 4 comprises a generally square coil-winding section 4a and a tooth end or a pole section 4b circumferentially projecting from both circumferential faces in the vicinity of the distal end of the coil-winding section 4a. Each pole section 4b has a circumferential width W2a set to be smaller than the width W1a of the coil-winding section 3a of each first tooth 3. The width W2b of each pole section 4b and the width W2a of each coil-winding section 4a are set as W2b>W2a under a ratio previously determined to prevent occurrence of partial magnetic saturation.

Slots 5 are defined by the first teeth 3 and the second teeth 4 respectively. Each slot 5 is formed into a semienclosed slot. The centers of slot openings 5a are shifted alternately in a direction of rotation of a rotor and in an opposite direction relative to the center line between the teeth 3 and 4.

Figure 5:
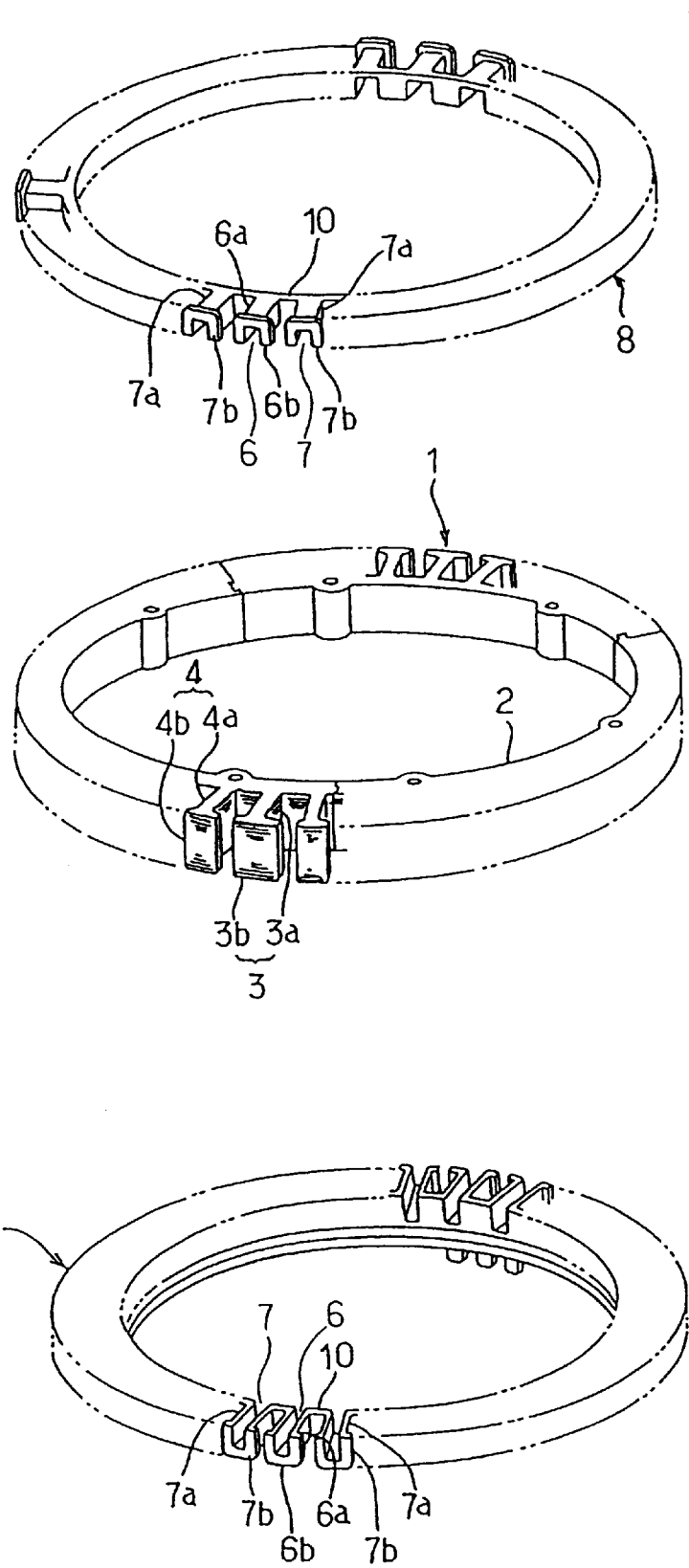
FIG. 5 is an exploded perspective view of the stator core and the insulating end plates.

The stator core 1 is covered with two insulating end plates 8 and 9 at both end sides thereof in the direction of axis of rotation of the rotor or at upper and lower sides thereof as viewed in FIG. 5, respectively. Each of the insulating end plates 8 and 9 is made from an insulating synthetic resin such as polybutylene terephthalate containing glass filler by injection molding. Each insulating end plate includes a ring-shaped portion 10, eighteen first slot insulating portions 6 radially extending from the ring-shaped portion 10, and eighteen second slot insulating portions 7 radially extending from the ring-shaped portion 10. The first and second slot insulating portions 6 and 7 of each insulating end plate are circumferentially disposed alternately at an equal pitch (=10 degrees).

Each first slot insulating portion 6 includes a tub-shaped first tooth cover 6a and a generally U-shaped first flange 6b located at a distal end of the first tooth cover 6a. Each tooth cover 6a has an inner width approximately equal to the width W1a of the coil-winding section 3a. Each flange 6b has a width approximately equal to the width W1b of the pole section 3b.

Each second slot insulating portion 7 includes a second tooth cover 7a having a tub-shaped section and a generally U-shaped second flange 7b located at a distal end of the second tooth cover 7a. Each tooth cover 7a has an inner width approximately equal to the width W2a of the coil-winding section 4a. Each flange 7b has a width approximately equal to the width W2b of the pole section 4b.

The first slot insulating portions 6 of the insulating end plates 8 and 9 are abutted against each other axially centrally with respect to the stator core 1 as shown in FIGS. 2, 3, 7 and 8. The second slot insulating portions 7 of the insulating end plates 8 and 9 are also abutted against each other axially centrally with respect to the stator core 1. Inner faces of the tooth covers 6a and 7a closely contact with the outer faces of the coil-winding sections 3a and 4a. The outer faces of the coil-winding sections 3a are covered with the tooth covers 6a. The outer faces of the coil-winding sections 4a are covered with the tooth covers 7a. Outer peripheral faces of the flanges 6b and 7b closely contact with inner peripheral faces of the pole sections 3b and 4b.

Figure 2:
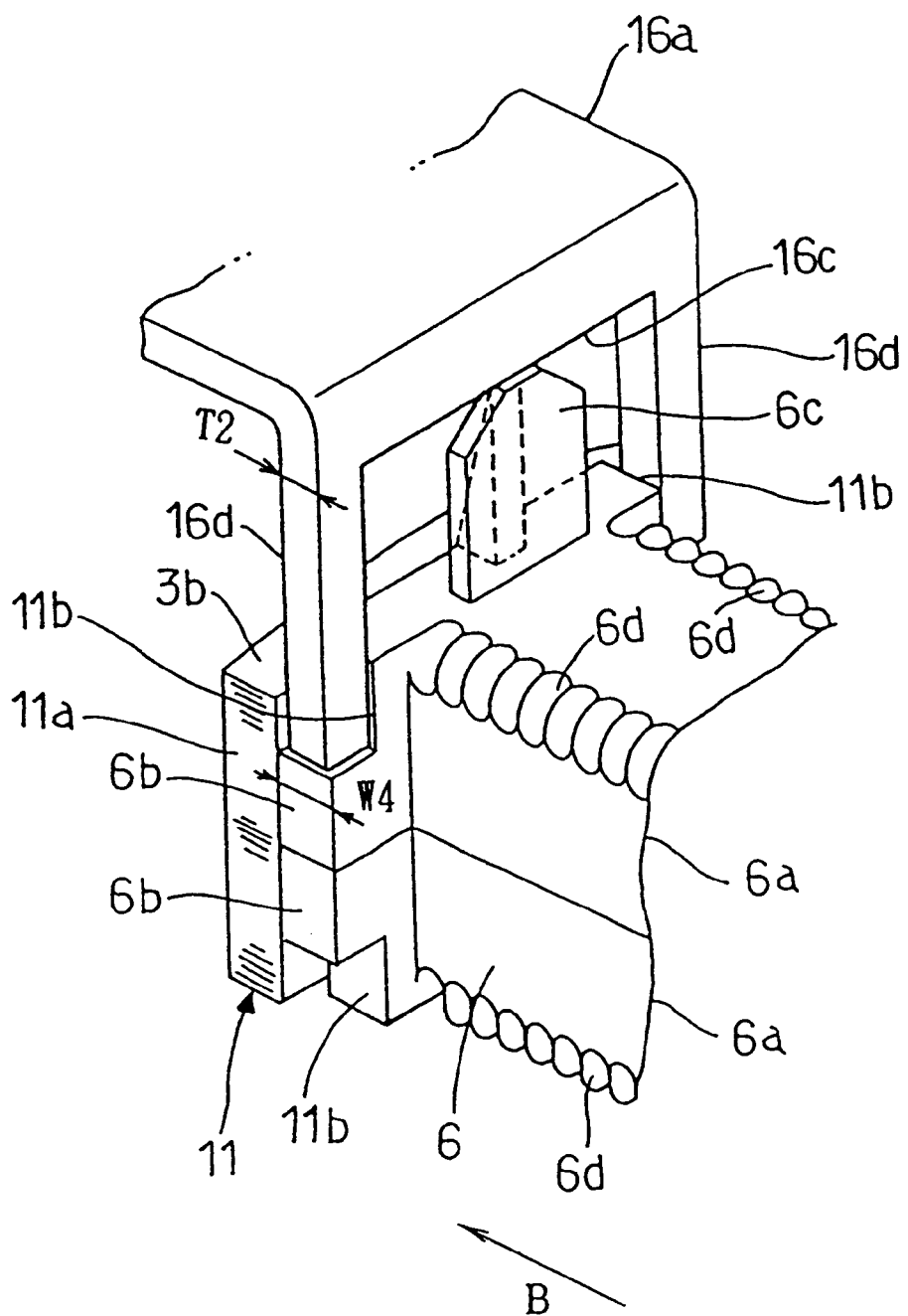
FIG. 2 is a perspective view showing a former of the winding machine moving along the first insulated tooth.
Figure 3:
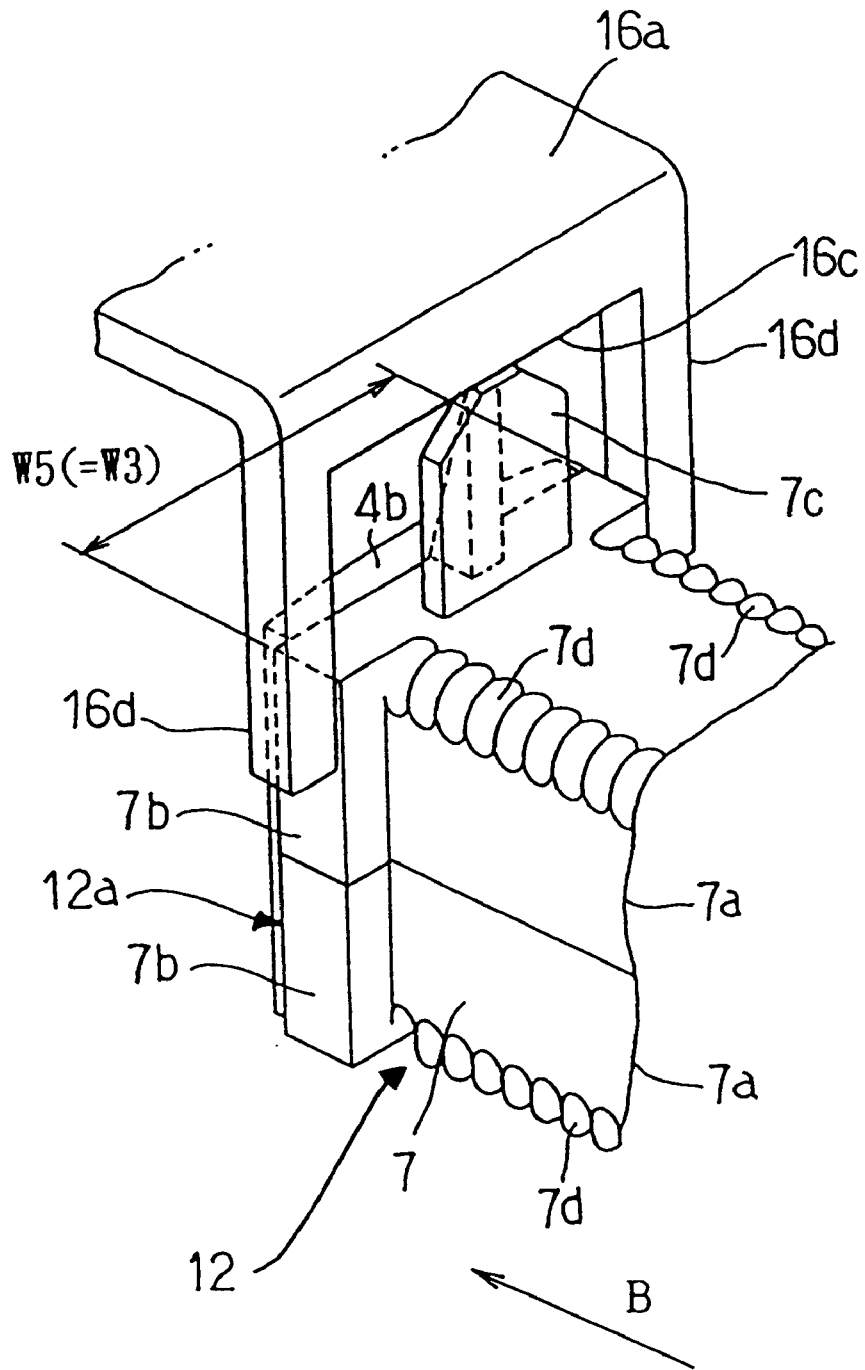
FIG. 3 is a perspective view showing the former moving along the second insulated tooth.
Figure 4:
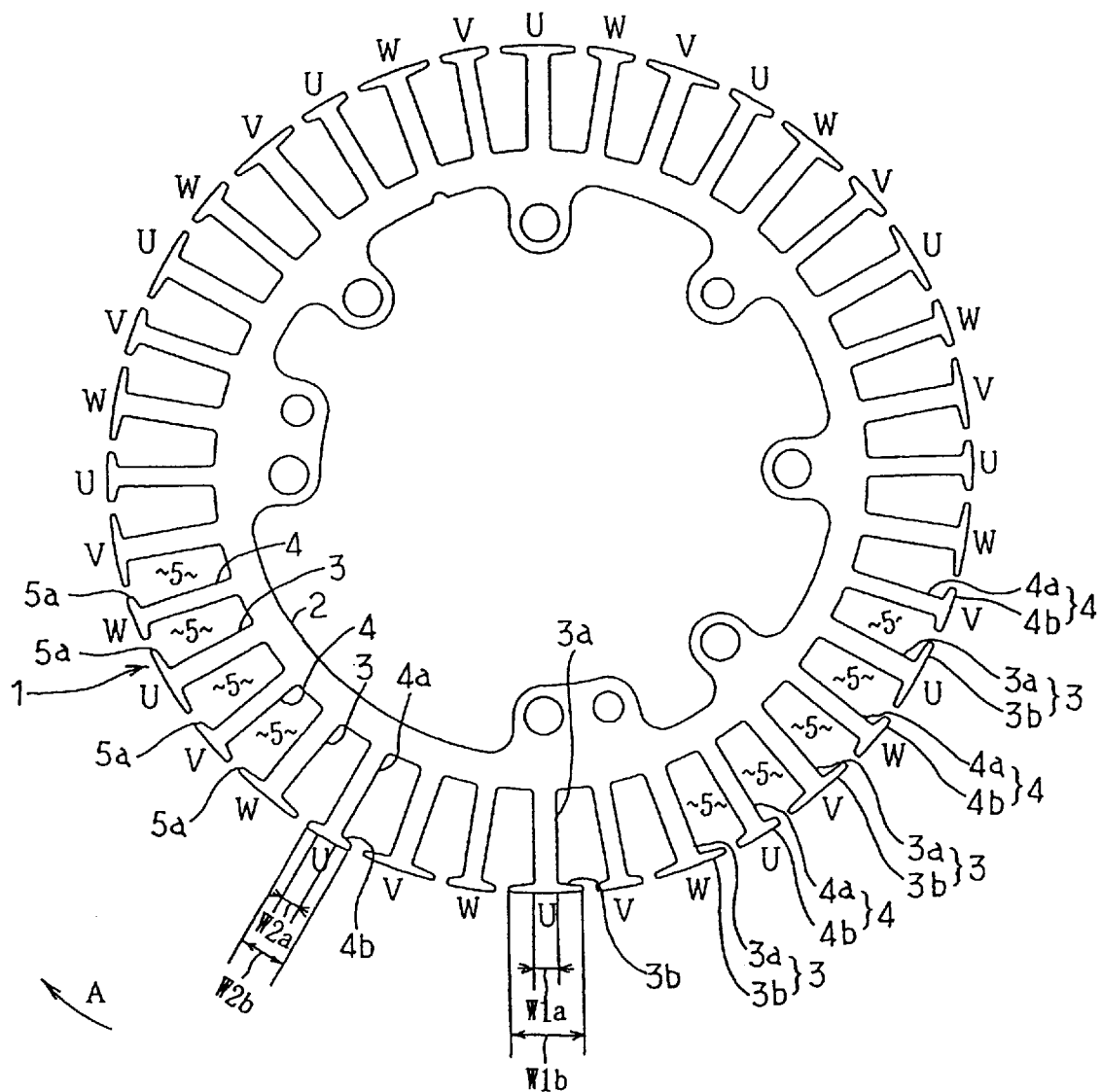
FIG. 4 is a top view of the stator core of the DC motor.
Figure 6:
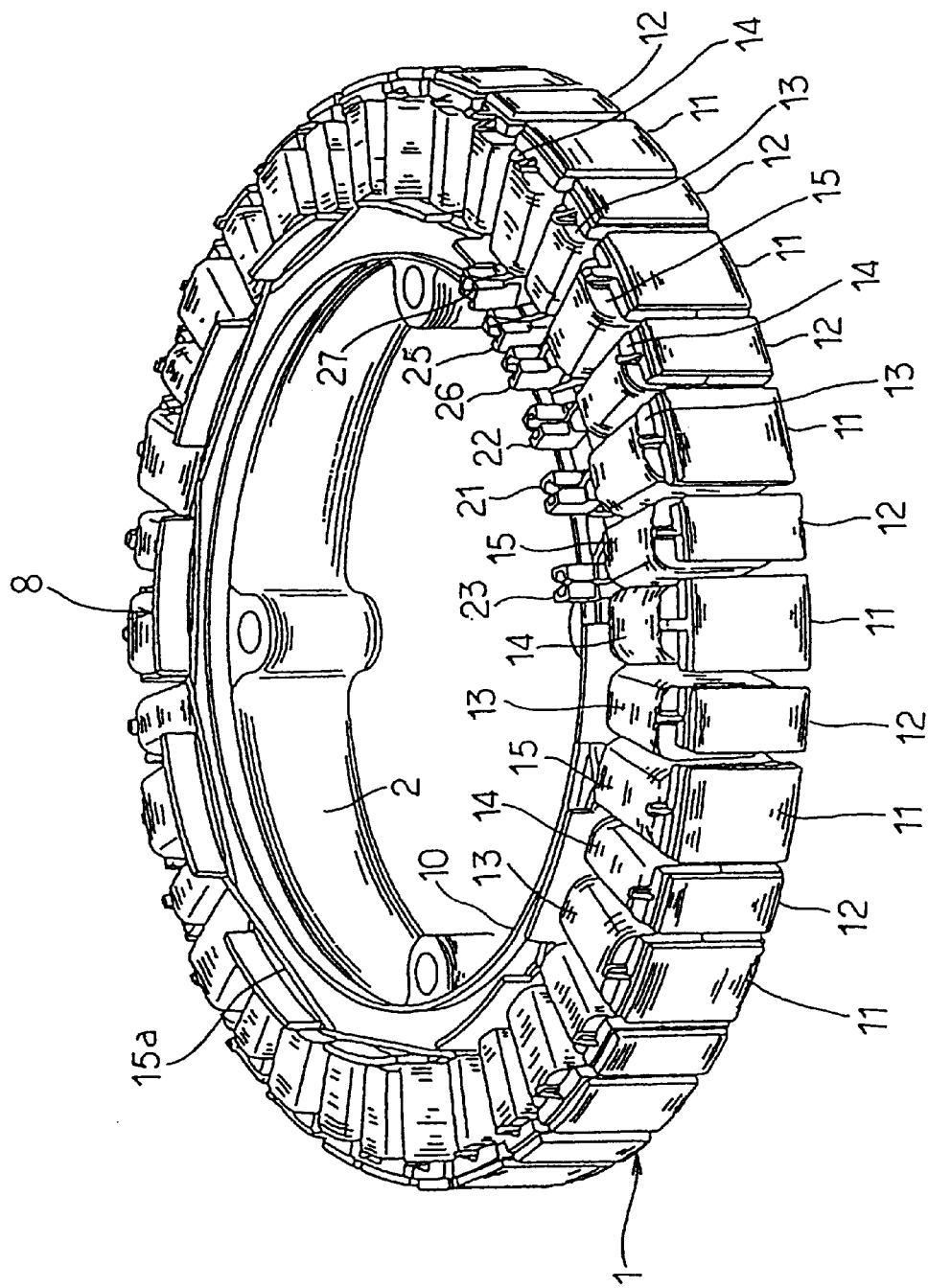
FIG. 6 is a perspective view of the stator of the DC motor.
Figure 7:
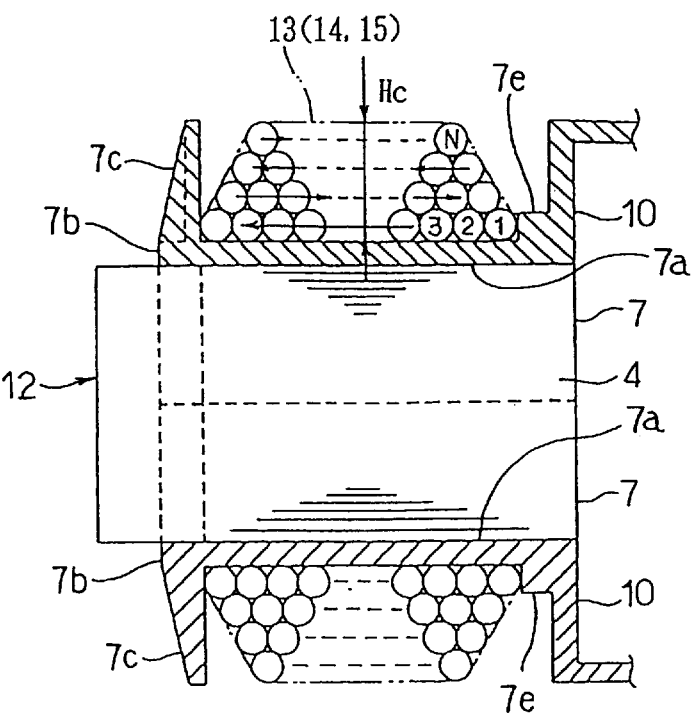
FIGS. 7 and 8 are longitudinal sections of the coils wound on the first and second insulated teeth respectively.

Reference numeral 11 in FIGS. 2, 3 and 6 designates wide first insulated teeth including the first teeth 3 and the slot insulating portions 6 covering the first teeth 3 respectively. Reference numeral 12 designates narrow second insulated teeth including the second teeth 4 and the second slot insulating portions 7 covering the second teeth 4 respectively.

Figure 12:
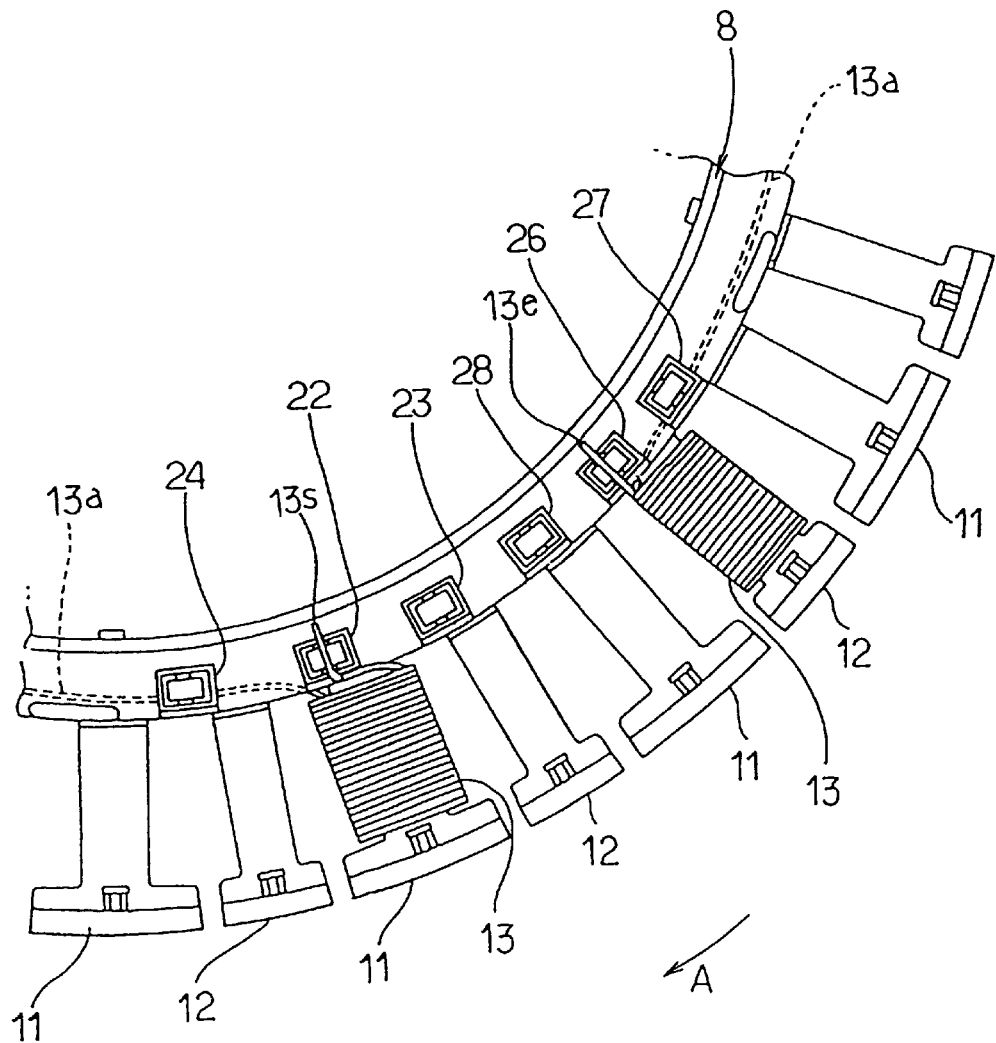
FIG. 12 is a partial top view of the stator core, showing the winding of the phase U coils.

Phase U coils 13 are wound on the outer peripheries of the insulated teeth 11 and 12 corresponding to the phase U, namely, on the outer peripheries of the slot insulating portions 6 and 7 respectively, as shown in FIGS. 6, 7, 8 and 12. These phase U coils 13 are formed by winding a single magnet wire continuously on six insulated teeth 11 and six insulated teeth 12 for every one tooth. In a winding sequence, as shown by reference symbol U in FIG. 4, the magnet wire is firstly wound on the wide first tooth 3. The magnet wire is secondly wound on the narrow second tooth 4 which is two teeth away from the firstly wound tooth 3 in the direction of arrow A in FIG. 1. Then, the magnet wire is thirdly wound on the wide first tooth 3 which is two teeth away from the secondly wound tooth 4 in the direction of arrow A. The magnet wire is continuously wound on these teeth 3 and 4 without being cut off. Intercoil wires 13a of the phase U coils 13 are disposed at the axial underside of the stator core 1 as shown in FIG. 12.

Figure 13:
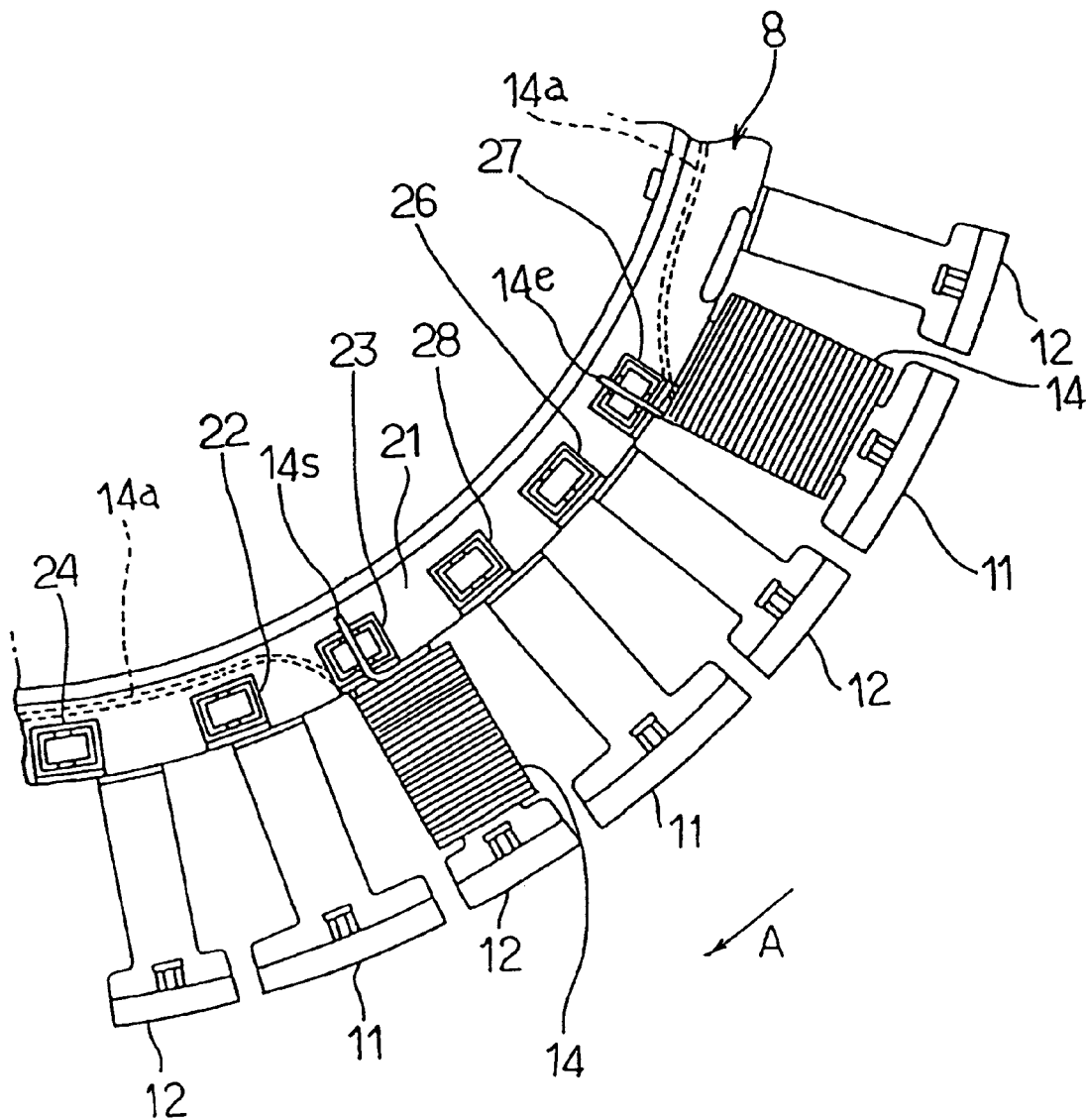
FIG. 13 is a partial top view of the stator core, showing the winding of the phase V coils.

Phase V coils 14 are wound on the outer peripheries of the insulated teeth 11 and 12 corresponding to the phase V, namely, on the outer peripheries of the slot insulating portions 6 and 7 respectively, as shown in FIG. 6. These phase V coils 14 are formed by winding a single magnet wire continuously on six insulated teeth 11 and six insulated teeth 12. In a winding sequence, as shown by reference symbol V in FIG. 4, the magnet wire is firstly wound on the wide first tooth 3. The magnet wire is secondly wound on the narrow second tooth 4 which is two teeth away from the firstly wound tooth 3 in the direction of arrow A in FIG. 4. Then, the magnet wire is thirdly wound on the wide first tooth 3 which is two teeth away from the secondly wound tooth 4 in the direction of arrow A. The magnet wire is continuously wound on these teeth 3 and 4 without being cut off. Intercoil wires 14a of the phase V coils 14 are disposed at the axial underside of the stator core 1 as shown in FIG. 13.

Figure 14:
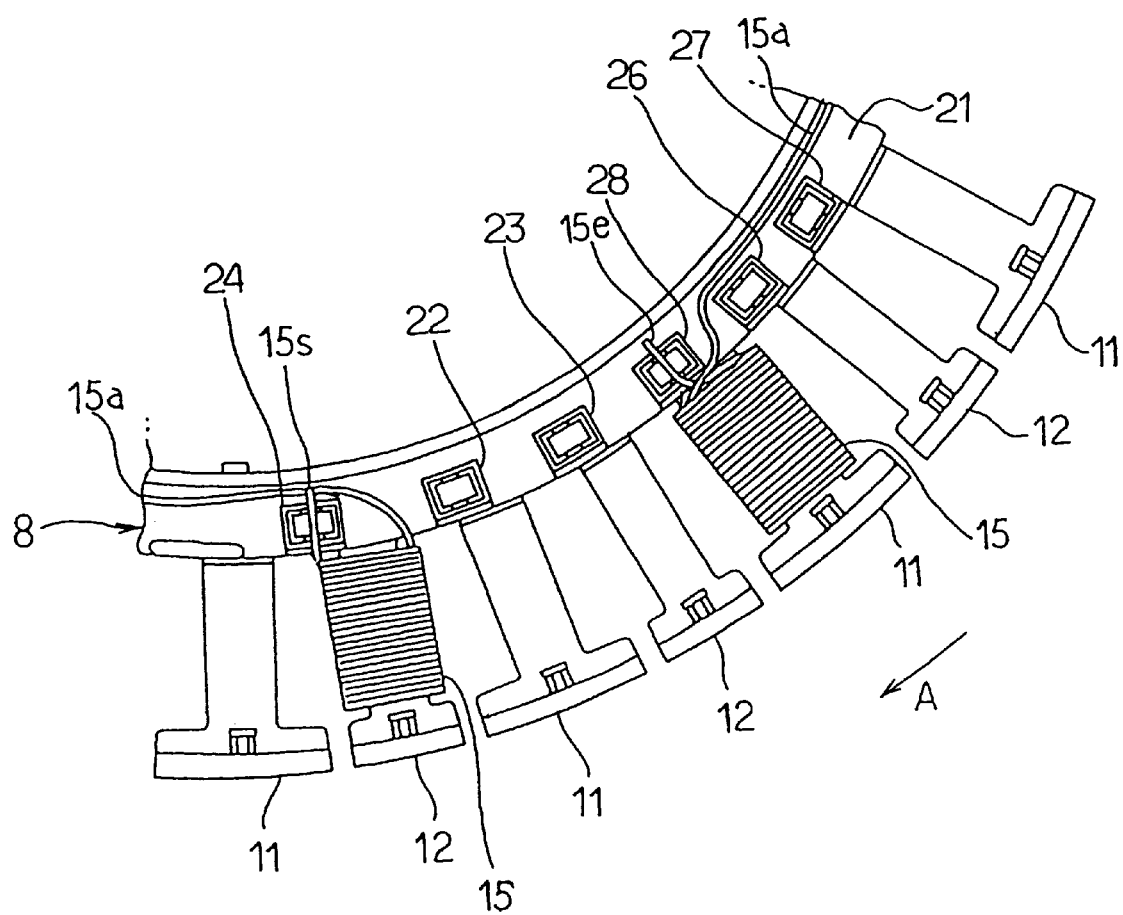
FIG. 14 is a partial top view of the stator core, showing the winding of the phase W coils.
Figure 15:
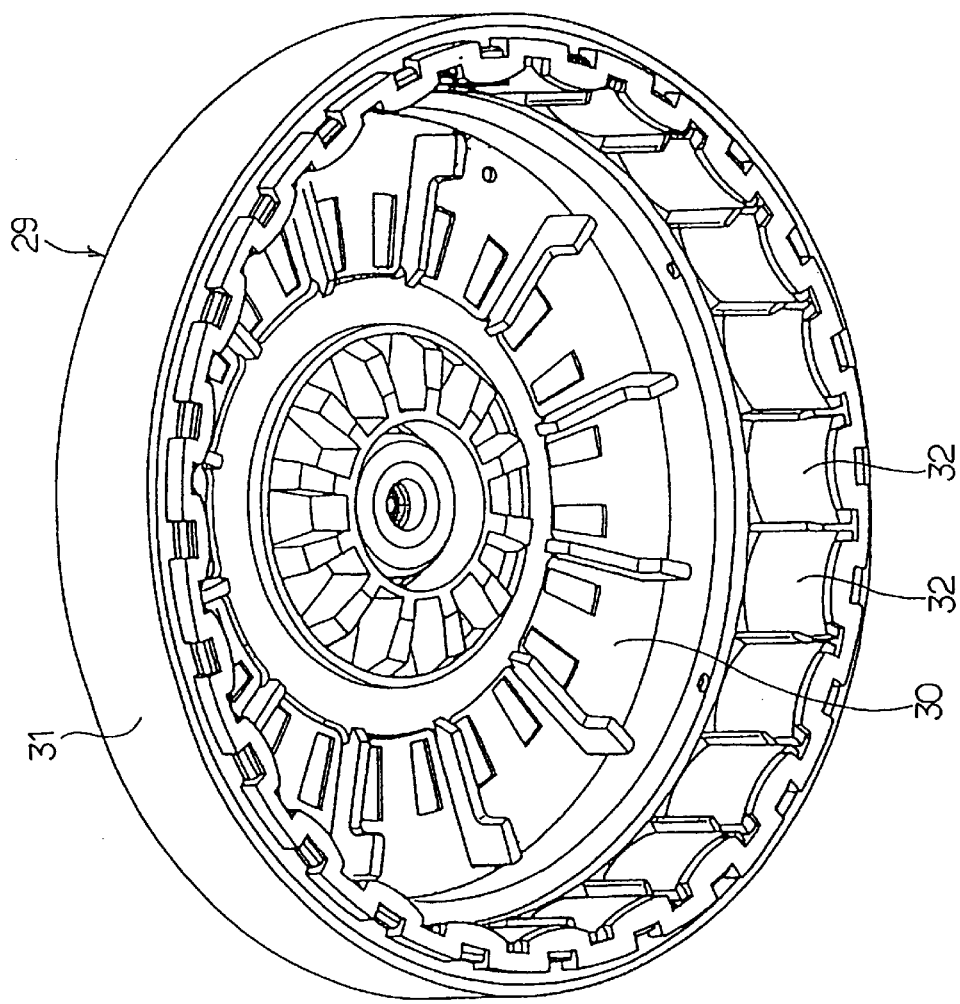
FIG. 15 is a perspective view of the rotor.
Figure 16:
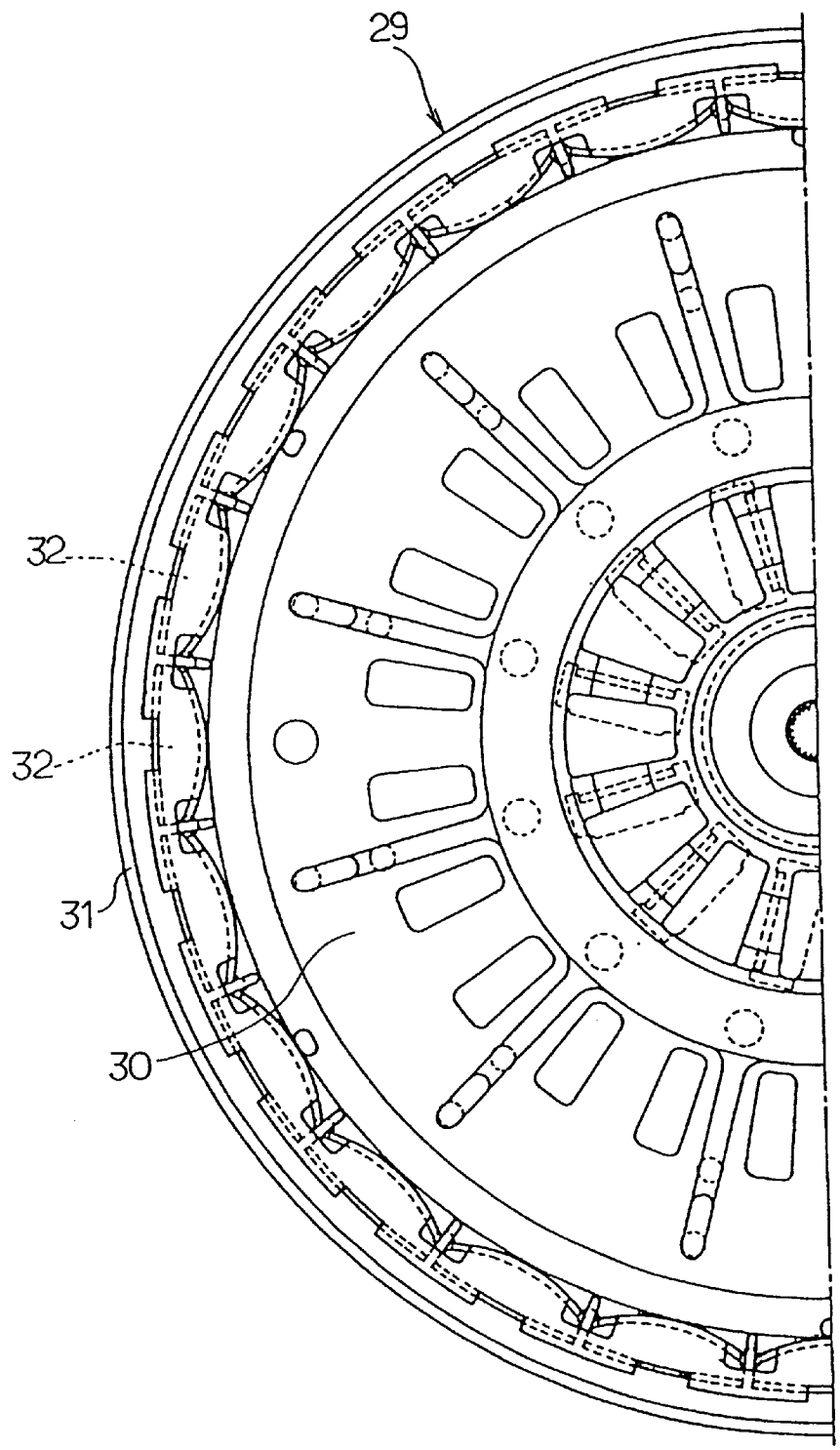
FIG. 16 is a partial plan view of the rotor.

Phase W coils 15 are wound on the outer peripheries of the insulated teeth 11 and 12 corresponding to the phase W, namely, on the outer peripheries of the slot insulating portions 6 and 7 respectively, as shown in FIG. 6. These phase U coils 15 are formed by winding a single magnet wire continuously on six insulated teeth 11 and six insulated teeth 12. In a winding sequence, as shown by reference symbol W in FIG. 4, the magnet wire is firstly wound on the wide first tooth 3. The magnet wire is secondly wound on the narrow second tooth 4 which is two teeth away from the firstly wound tooth 3 in the direction of arrow A in FIG. 4. Then, the magnet wire is thirdly wound on the wide first tooth 3 which is two teeth away from the secondly wound tooth 4 in the direction of arrow A. The magnet wire is continuously wound on these teeth 3 and 4 without being cut off. Intercoil wires 15a of the phase W coils 15 are disposed at the upper face side of the stator core 1 as shown in FIGS. 6 and 14. Thus, the intercoil wires 15a of the phase W coils 15 are disposed at the side opposite the intercoil wires 13a and 14a of the phase U and V coils 13 and 14.

In each of the coils 13 to 15, the magnet wire is wound alternately from the root side to the distal end side of the tooth and from the distal end side to the root side for every one layer, so that each coil is formed into a four-layer regular winding having a generally trapezoidal (pyramidal, for example) shape in cross section. The beginning and termination of each of the coils 13 to 15 are located at the root side of each of the insulated teeth 11 and 12. Numerals assigned to the wound coil turns in FIG. 7 designate the winding sequence. The number of turns of the coils 13 to 15 per turn is decreased one as each coil is wound to the upper layers.

Figure 8:
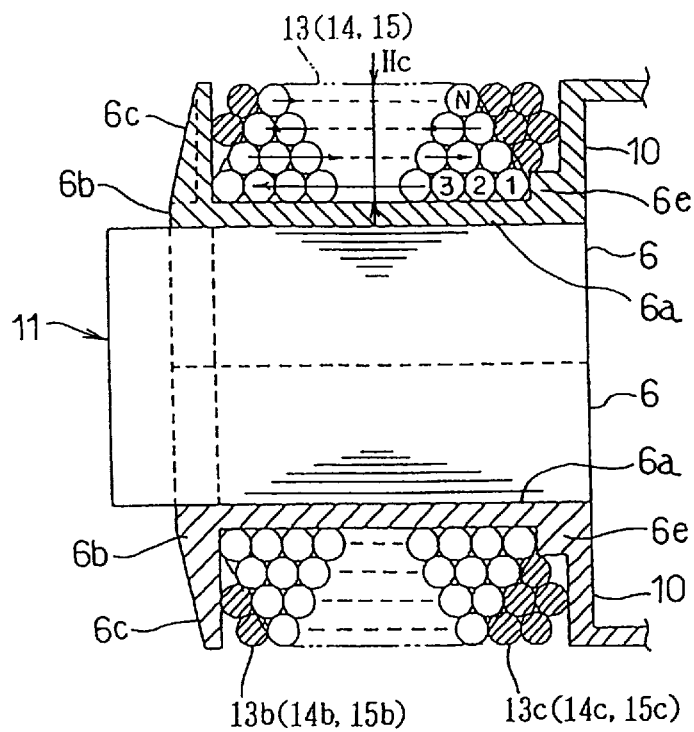

Additional coils 13b, 14b and 15b and 13c, 14c and 15c are further wound on the respective wide first insulated teeth 11 as shown in FIG. 8. The additional coils 13b to 15b and 13c to 15c are located at radially opposite ends of the respective coils 13 to 15. The additional coils 13b to 15b and 13c to 15c are wound successively from the winding of the coils 13 to 15 so as to fill up spaces at opposite ends of the coils, respectively. The final layers of the coils 13 to 15 and final layers of the additional coils 13b to 15b and 13c to 15c are set so as to be approximately at the same axial height.

The flanges 6b and 7b of the slot insulating portions 6 and 7 have integrally formed protrusions 6c and 7c respectively. The protrusions 6c and 7c are eliminated for clarity in FIG. 5. Each of the protrusions 6c and 7c has approximately the same axial height as each of the coils 13 to 15. The protrusions 9c and 10c prevent the coils 13 to 15, the auxiliary coils 13b to 15b and 13c to 15c from sliding down toward the distal end sides of the teeth 3 and 4.

The slot insulating portions 6 and 7 have a plurality of guide grooves 6d and 7d located at circumferential both ridges of the tooth covers 6a and 7a respectively as shown in FIGS. 1 to 3. Each of the guide grooves 6d and 7d has approximately the same width as the diameter R (=0.6 mm) of the magnet wire and a depth set approximately at one half of the diameter R of the magnet wire. The turns of the magnet wire constituting the lower most layers of the respective coils 13 to 15 are accommodated in the guide grooves 6d and 7d.

Figure 17:
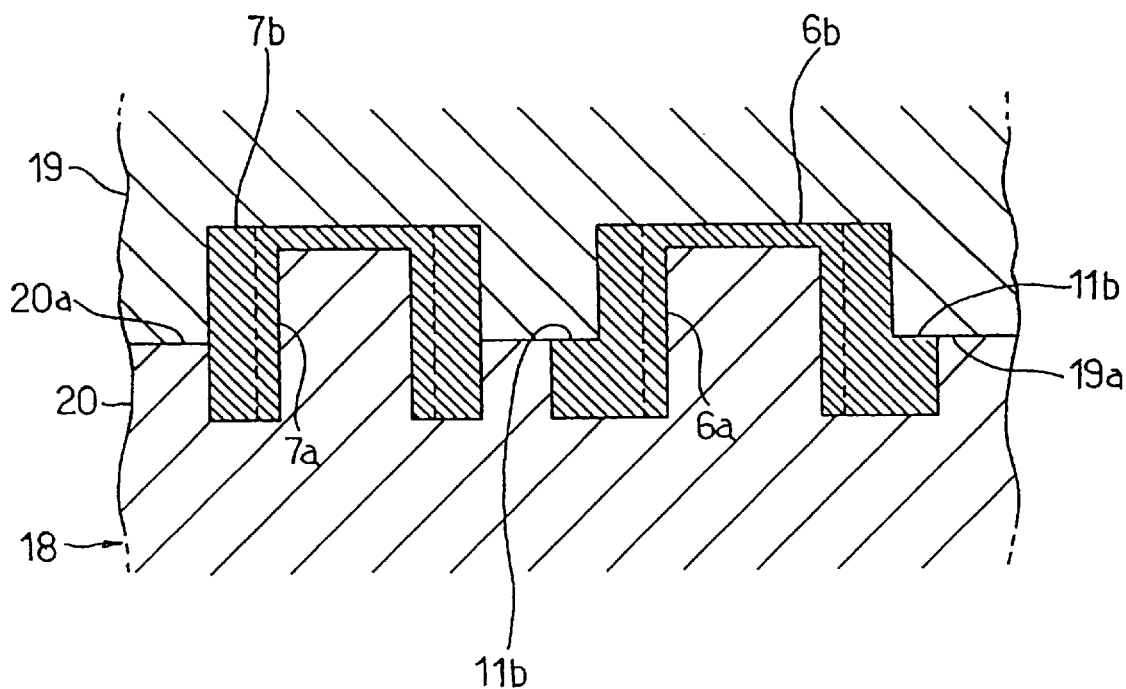
FIG. 17 is a partial sectional view of a forming die for the insulating end plates.

The coils 13 to 15 and the additional coils are wound on the insulated teeth 11 and 12 by rotating a head of an automatic winding machine (not shown). A former 16 as well known in the art is mounted on the winding machine to be moved together, as shown in FIG. 17. The former 16 includes a pair of upper guide pieces 16a and 16b. The guide piece 16a has a pair of guide protrusions 16d formed on the distal end thereof to be opposed to each other with an escape groove 16c defined therebetween. The coil-winding section of each of the insulated teeth 11 and 12 passes through the escape groove 16c. The escape groove 16c has a width slightly larger than the coil wound on each wide tooth 11. Another guide piece 16e opposed to the guide protrusions 16d extends integrally from the distal end of the guide piece 16b. A guide groove 17a is defined between vertical portions of the guide protrusions 16d and the guide plate 16e. The guide groove 17a has a width slightly larger than the diameter of a magnet wire (shown by reference symbol "Wa" in FIGS. 9 and 10).

Figure 10:
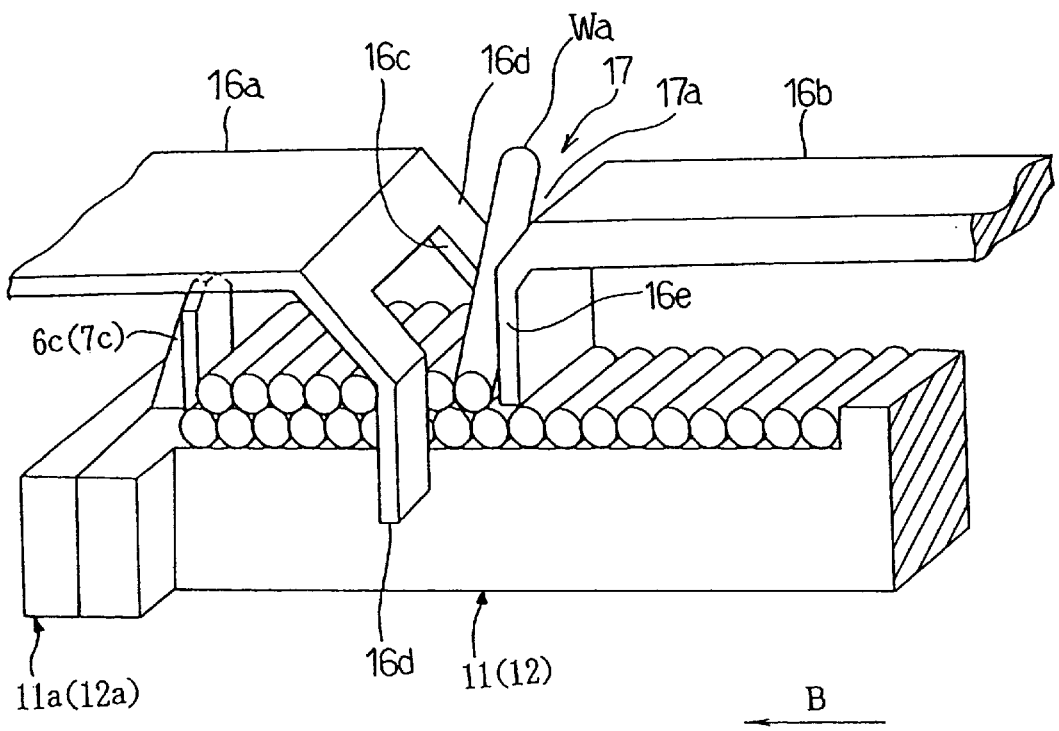
FIG. 10 is a schematic perspective view showing the locational relation between the former and the insulated tooth.

In the winding of the coils, the upper former 17 is disposed over the insulated teeth 11 and 12 as shown in FIG. 10. A lower former (not shown) which is the same as the upper former 17 is disposed below the insulated teeth 11 and 12. These formers are intermittently moved simultaneously at the pitch R in the direction of projection of each tooth or in the direction of arrow B and in the direction opposite the arrow B so that the magnet wire Wa is guided along the guide groove 17a of the former 17, thereby being wound on the outer peripheries of the insulated teeth 11 and 12 into a regular winding.

Figure 9:
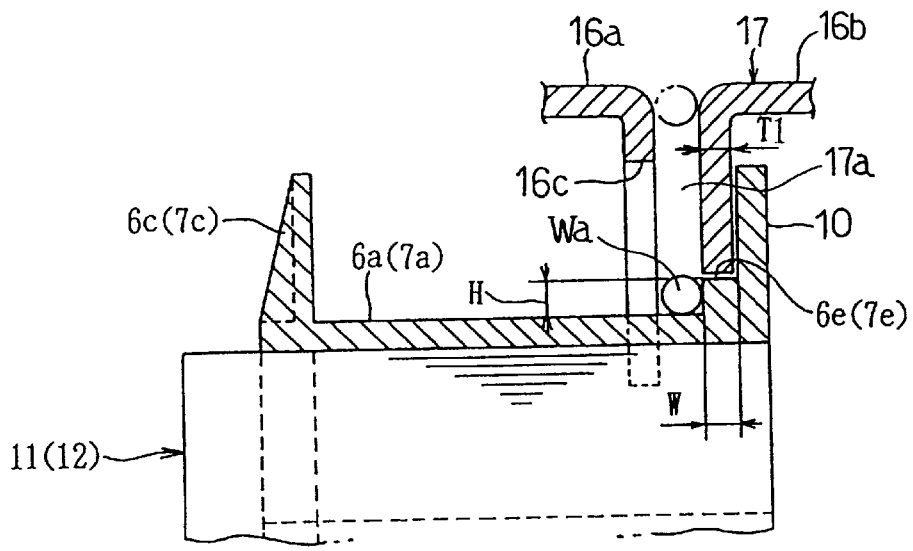
FIG. 9 is a partial longitudinal section showing the first turn of the coil caused to fall along the rising step.

The tooth covers 6a and 7a of the respective end plates 8 and 9 have rising steps 6e and 7e formed integrally on the root peripheries thereof respectively as shown in FIG. 9. Each of the rising steps 6e and 7e has a rising height H set in the relation of $R/2 < H \leq 2R$ where R is the diameter of the magnet wire Wa and a dimension in the direction of projection of the tooth or a thickness W set to be approximately equal to a thickness T1 of the guide plate 16e of the former 17. A first turn of the magnet wire Wa of each of the coils 13 to 15 is caused to fall through the guide groove 17a between the guide pieces 16a and 16b to be located along the step 6e or 7e.

Each first insulated tooth 11 has four notches 11b formed in rear portions of the corners of the pole sections 11a provided at the distal end thereof respectively as shown in FIGS. 1 to 3. Each notch 11b has a rectangular shape corresponding to each guide protrusion 16d of the guide piece 16a. Each notch 11b has an axial depth D set to be five times or more the diameter of the magnet wire Wa and to be one half or more of the thickness Hc (see FIGS. 7 and 8) of each of the wound coils 13 to 15. The depth D of each notch 11b is set at 5 mm in the embodiment. Furthermore, the notches 11b are formed by partially cutting off the flanges 6b and 7b of the insulating end plates respectively in the embodiment.

A width W3 of the portion of the flange 6b excluding the notches 11b is set to be slightly smaller than the width of the escape groove 16c of the guide piece 16a. A width W4 of each notch 11b with respect to the direction of projection of the tooth is set to be larger than the thickness T2 of each guide protrusion 16d as shown in FIG. 2. Accordingly, in the case where the coils 13 to 15 and the additional coils 13b to 15b are wound on the respective wide insulated teeth 11, the guide protrusions 16d, when assuming reversing positions thereof, are fitted into the respective notches 11b.

The flange 7b of each second insulated tooth 12 has a width W5 set to be approximately equal to the width W3 of the flange 6b. Accordingly, each guide protrusion 16d of the guide piece 16a passes the flange 7b when each of the coils 13 to 15 is wound on the narrow second tooth 12.

FIG. 17 illustrates a forming die assembly 18 used for injection molding the insulating end plates 8 and 9. The forming die assembly 18 comprises a fixed die 19 and a movable die 20. Die abutting faces 19a and 20a of the respective fixed and movable dies 19 and 20 are set to be coplanar with the bottom faces of the notches 11b of each flange 6b. As a result, a parting line of the insulating end plates 8 and 9 is set along the bottom face of the notch 11b.

Figure 11:
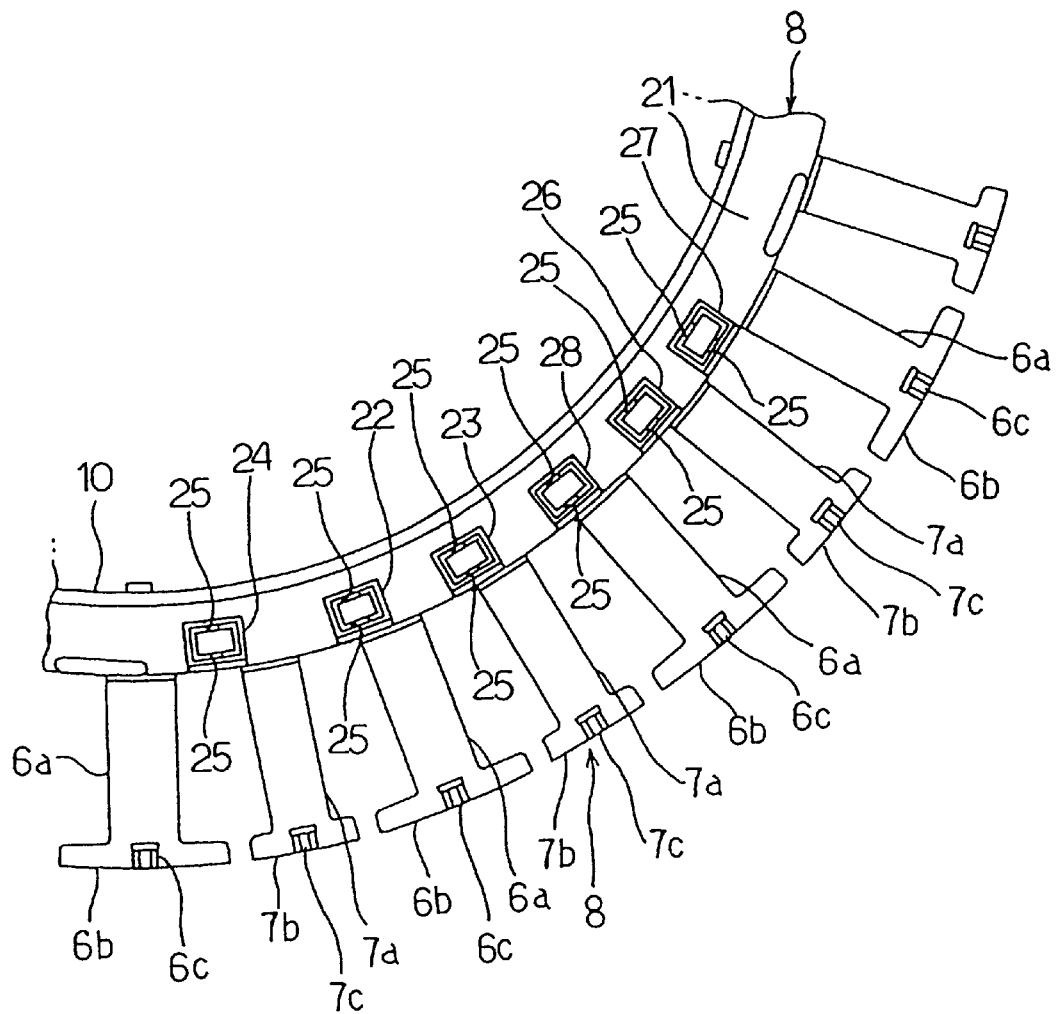
FIG. 11 is a partial enlarged top view of the insulating end plate.

The upper insulating end plate 8 has an intercoil wire guide groove 21. A bottom plate of the intercoil wire guide groove 21 has integrally formed rectangular cylindrical terminal insertion portions 22 to 24 as shown in FIG. 11. Each of the terminal insertion portions 22 to 24 has inner and outer peripheral walls formed with generally U-shaped small grooves 25. The first of the twelve phase U coils 13 is wound on the wide first insulated tooth 11 located in the vicinity of the terminal insertion portion 22. The beginning 13s of the twelve serially wound phase U coils 13 is inserted in both small grooves 25 of the terminal insertion portion 29.

The first of the twelve phase V coils 14 is wound on the narrow second insulated tooth 12 located in the vicinity of the terminal insertion portion 23 as shown in FIG. 13. The beginning 14s of the twelve serially wound phase V coils 14 is inserted in both small grooves 25 of the terminal insertion portion 23. The first of the twelve phase W coils 15 is wound on the narrow second insulated tooth 12 located in the vicinity of the terminal insertion portion 24, as shown in FIG. 14. The beginning 15s of the twelve phase w coils 15 is inserted in both small grooves 25 of the terminal insertion portion 24.

The intercoil wire guide groove 21 of the upper insulating end plate 8 has integrally formed rectangular cylindrical terminal insertion portions 26 to 28 as shown in FIG. 14. Each of the terminal insertion portions 26 to 28 has inner and outer peripheral walls formed with small grooves 25. The twelfth of the twelve phase U coils 13 is wound on the narrow second insulated tooth 11 located in the vicinity of the terminal insertion portion 26. The termination 13e of the twelve serially wound phase U coils 13 is inserted in both small grooves 25 of the terminal insertion portion 26.

The twelfth of the twelve phase V coils 14 is wound on the wide first insulated tooth 11 located in the vicinity of the terminal insertion portion 27 as shown in FIG. 13. The termination 14e of the twelve serially wound phase V coils 14 is inserted in both small grooves 25 of the terminal insertion portion 27. The twelfth of the twelve phase W coils 15 is wound on the wide first insulated tooth 11 located in the vicinity of the terminal insertion portion 28, as shown in FIG. 14. The termination 15e of the twelve phase W coils 15 is inserted in both small grooves 25 of the terminal insertion portion 28.

Common connecting terminals (not shown) are inserted in the terminal insertion portions 22 to 24 respectively. External connecting terminals (not shown) are inserted in the terminal insertion portions 26 to 28 respectively. Each of these terminals breaks through a sheath of the magnet wire during the step of insertion to thereby come into contact with the conductors. A terminal block (not shown) made from a synthetic resin is mounted on the upper insulating end plate 8. The common connecting terminals are connected via a conductive plate embedded in the terminal block in common with each other. The external connecting terminals are connected via a conductive plate embedded in the terminal block to a power supply (not shown). Thus, the phase coils 13 to 15 are connected in a three-phase configuration to the power supply.

A rotor 29 is disposed to be outside the stator core 1. The rotor 29 comprises a dish-shaped metal frame 30 with a closed upper end, a ring member 31 made from a synthetic resin and extending along an outer circumferential face of an opening of the frame 30, twenty-four rotor magnets 32 disposed along an inner circumferential face of the opening of the frame 30. The frame 30, ring member 31 and rotor magnets 32 are integrated by a resin. An output shaft (not shown) is connected to a central portion of the rotor 29. Inner peripheral faces of the rotor magnets 32 are opposed to the outer peripheral faces of the pole sections 3b of the first teeth 3 and the pole sections 4b of the second teeth 4 with a predetermined gap therebetween.

A manner of winding the coils 13 to 15 will now be described. The insulating end plates 8 and 9 are put onto the stator core 1 from axial both sides. Thereafter, as shown in FIG. 12, the beginning 13s of the magnet wire is inserted into both small grooves 25 of the terminal insertion section 22. The common connecting terminal is pushed into the terminal insertion section 22 so that the beginning 13s is fixed by the common connecting terminal. Upon rotation of the head of the winding machine in the above-described condition, the magnet wire is wound on the wide first insulated tooth 11 located in the vicinity of the terminal insertion section 22.

The two formers 17 located at axial both sides of the stator core 1 are intermittently moved at the pitch R repeatedly alternately from the root of the insulated tooth 11 toward the distal end side of the tooth or in the direction of arrow B and from the distal end side toward the root side of the tooth 11 so that the magnet wire Wa for the first turn is guided to be located along the rising face of the step 6e and the magnet wire for the second and subsequent turns is caused to fall into the guide groove 6d, as shown in FIG. 9. Subsequently, when the guide protrusions 16d are fitted into the notches 11b respectively, the magnet wire Wa is caused to fall into the outermost guide groove 6d, as shown in FIG. 2, so that a first layer of the phase U coil 13 is wound. Only the axial upper guide piece 16a is shown in FIG. 2.

Upon completion of the winding for the first layer of the phase U coil 13, the formers 17 are moved repeatedly alternately in the direction opposite the arrow B and then in the direction of arrow B so that the magnet wire of the upper layer is caused to fall between the turns of the magnet wire of the lower layer. As a result, the second, third and fourth layers of the phase U coil 13 are sequentially wound. In the winding of the second to fourth layers of the phase U coils 13, each former is moved by a pitch according to the diameter R of the magnet wire for every increase of one layer in such a direction as to depart from the axial end face of the insulated tooth 11.

When the phase U coil 13 has been wound on the wide first insulated tooth 11, the magnet wire is wound on the narrow second insulated tooth 12 which is two teeth away from the previously wound tooth 11 in the direction of arrow A, in the same manner as described above. The upper and lower formers 17 are intermittently moved at the pitch R from the root side of the narrow second insulated tooth 12 so that the magnet wire for the first turn is guided to be located along the rising face of the narrow step 7e and the magnet wire for the second and subsequent turns is caused to fall into the guide groove 7d. As shown in FIG. 3, each guide protrusion 16d passes the flange 7b and is further moved so that the magnet wire is caused to fall into the guide groove 7d located at the distal end of the tooth and the first layer of the phase U coil 13 is wound. Only the former 17 located at the axial upper face side is shown in FIG. 3.

When the phase U coil 13 has been wound on the narrow second insulated tooth 12, the phase U coils 13 are sequentially wound on the wide first insulated tooth 11 two teeth away from the previously wound tooth 12 in the direction of arrow A and the narrow second insulated tooth 12 two teeth away from the previously wound tooth 11. Finally, the phase U coil 13 is wound on the narrow second insulated tooth 12 two teeth away from the firstly wound tooth 11 in the direction opposite to arrow A, as shown in FIG. 12. Thereafter, the termination 13e of the phase U coils 13 is inserted into the grooves 25 of the terminal insertion portion 26, and the external connecting terminal is pushed into the terminal insertion portion 26 so that the termination 13e is brought into electrical contact with the external connecting terminal and also fixed.

When the twelve phase U coils 13 have been wound on the insulated teeth 11 and 12, the beginning 14s of the magnet wire is inserted into the grooves 25 of the terminal insertion portion 23, and the common connecting terminal is pushed into the terminal insertion portion 23 so that the beginning 14s is brought into electrical contact with the common connecting terminal and also fixed, as shown in FIG. 13. The head of the winding machine is then rotated so that the magnet wire is wound on the narrow second insulated tooth 12 adjacent to the wide first insulated tooth 11 on which the first phase U coil 13 has been wound, in the direction opposite to arrow A, whereby the phase V coil 14 is wound.

The formers 17 are moved repeatedly alternately from the tooth root side toward the tooth distal end side and from the tooth distal end side to the tooth root side, so that the phase V coil 14 is wound in the same manner as the phase U coils 13. Thus, the direction of movement of the formers 17 is reversed for every one layer. When the phase V coil 14 has been wound on the narrow second insulated tooth 12, another phase V coil 14 is wound on the wide first insulated tooth 11 two teeth away from the previously wound narrow tooth 12 in the direction of arrow A.

When the phase V coil 14 has been wound on the wide first insulated tooth 11, the phase V coils 14 are sequentially wound on the narrow second insulated tooth 12 two teeth away from the previously wound tooth 11 in the direction of arrow A and the wide first insulated tooth 11 two teeth away from the previously wound tooth 12. Finally, the phase V coil 14 is wound on the wide first insulated tooth 11 two teeth away from the firstly wound tooth 12 in the direction opposite to arrow A, as shown in FIG. 13. Thereafter, the termination 14e of the phase V coils 14 is inserted into the grooves 25 of the terminal insertion portion 27, and the external connecting terminal is pushed into the terminal insertion portion 27 so that the termination 14e is brought into electrical contact with the external connecting terminal and also fixed.

When the twelve phase V coils 14 have been wound on the insulated teeth 11 and 12, the beginning 15s of the magnet wire is inserted into the grooves 25 of the terminal insertion portion 24, and the common connecting terminal is pushed into the terminal insertion portion 24 so that the beginning 15s is brought into electrical contact with the common connecting terminal and also fixed, as shown in FIG. 14. The head of the winding machine is then rotated so that the magnet wire is wound on the narrow second insulated tooth 12 adjacent to the wide first insulated tooth 11 on which the first phase U coil 13 has been wound, in the direction of arrow A, whereby the phase W coil 15 is wound.

The formers 17 are moved repeatedly alternately from the tooth root side toward the tooth distal end side and from the tooth distal end side to the tooth root side, so that the phase W coil 15 is wound in the same manner as the phase U and V coils 13 and 14. Thus, the direction of movement of the formers 17 is reversed for every one layer. When the phase W coil 15 has been wound on the narrow second insulated tooth 12, another phase V coil 14 is wound on the wide first insulated tooth 11 two teeth away from the previously wound narrow tooth 12 in the direction of arrow A.

When the phase W coil 15 has been wound on the wide first insulated tooth 11, the phase W coils 15 are sequentially wound on the narrow second insulated tooth 12 two teeth away from the previously wound tooth 11 in the direction of arrow A and the wide first insulated tooth 11 two teeth away from the previously wound tooth 12. Finally, the phase V coil 14 is wound on the wide first insulated tooth 11 two teeth away from the firstly wound tooth 12 in the direction opposite to arrow A, as shown in FIG. 14. Thereafter, the termination 15e of the phase W coils 15 is inserted into the grooves 25 of the terminal insertion portion 28, and the external connecting terminal is pushed into the terminal insertion portion 28 so that the termination 15e is brought into electrical contact with the external connecting terminal and also fixed.

After the coils 13 to 15 have been wound on the wide first insulated teeth 11 respectively, the formers 17 are moved alternately to the tooth distal end side and to the tooth root side so that magnet wire is caused to fall to the both end sides. As a result, the additional coils 13b to 15b are formed at the tooth distal end side, and the additional coils 13c to 15c are formed at the tooth root side. The intercoil wires are drawn to the tooth root side.

According to the foregoing embodiment, the width W1b of the pole sections 3b of the first teeth 3 differs from the width W2b of the pole sections 4b of the second teeth 4. Accordingly, the openings 5a of the slots 5 are displaced alternately in the direction of rotation of the rotor and the direction opposite the rotation direction, namely, in the direction of arrow A and the direction opposite arrow A relative to the centers of the teeth 3 and 4. Consequently, since the variations in the permeance between the rotor 29 and the stator core 31 are reduced, the cogging torque can effectively be reduced.

The notches 11b are formed in the pole section 11a of each wide first insulated tooth 11. Since the guide protrusions 16d of each former 17 are escaped into the notches 11b, the coils 13 to 15 can be wound on both of the wide first and narrow second teeth 11 and 12 using the former of a single size. Consequently, since the formers 17 need not be exchanged according to the widths of the teeth, the coil winding efficiency can be improved and a time required for winding the coils 13 to 15 can be shortened.

The notches 11b are not formed in the stator core 1 but in the slot insulating sections 6 of the insulating end plates 8 and 9 which are substantially integral with the stator core 1. Thus, since the notches extending through the pole section 3b are not necessary, the reduction in the cogging torque is not adversely affected. Moreover, since the notches 11b are formed only in the slot insulating portions 6, the stacked steel sheets with the same shape can be used and accordingly, a plurality of types of steel sheets need not be provided. Consequently, the manufacturing efficiency can be improved and the notches 11b can readily be formed.

The notches 11b are located so as to correspond to the guide protrusions 16d of each former 17. Accordingly, each former 17 is linearly moved along the first insulated tooth 11 so that the guide protrusions 16d can be escaped into the respective notches 11b. Consequently, a mechanism and a control arrangement for moving the former 17 can be simplified.

Figure 18:
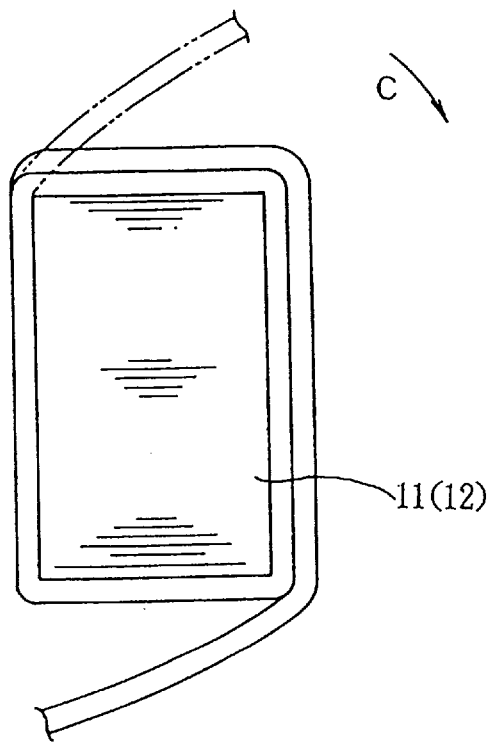
FIG. 18 illustrates a magnet wire being wound on the tooth.

When the magnet wire is wound on each first tooth 11 in the direction of arrow C in FIG. 18, the magnet wire is wound on each first insulated tooth 11 from the left-hand end to the right-hand end thereof at the upper face side as shown by two dot chain lines, whereas the magnet wire is wound from the right-hand end to the left-hand end at the lower face side. For this reason, the location where the magnet wire is wound is preferably set at the right-hand end of the insulated tooth 11 at the upper face side, whereas, at the lower face side, the magnet wire is preferably set at the left-hand end of the insulated tooth 11 diagonal to the right-hand end at the upper face side. In the foregoing embodiment, the notches 11b are provided in each slot insulating section 6. The guide protrusions 16d are formed in the circumferential opposite ends of the former 17 located at the upper face side and in the circumferential opposite ends of the former 17 located at the lower face side, so that the guide protrusions 16d can be escaped into the notches 11b respectively. Thus, even when the coils 13 to 15 are wound in the opposite direction for every one pole, the magnet wire is guided between the diagonal locations with respect to the insulated tooth 11. Consequently, the coils 13 to 15 can stably be wound on the first insulated teeth 11. Moreover, the notches improve the balance of the flange 6b. Since this results in a smooth flow of molten resin in the forming die, the forming efficiency of the insulated end plates 8 and 9 can be improved.

The width W3 of a pole body 11a of each first insulated tooth 11 excluding the notches 11b is set to be approximately equal to the width of an opposed section 12a of each insulated tooth 12. Accordingly, the inner surface of the escape groove 16c of each former 17 comes closer to the second insulated tooth 12 in this case than when the width W5 is set to be sufficiently smaller than the width W3. Consequently, since the magnet wire is stably guided, the coils 13 to 15 wound on the second insulated teeth 12 can be rendered stable.

The width W4 of each notch 11b in the direction of projection of the tooth is set to be larger than the thickness T2 of each guide protrusion 16d. Accordingly, the guide protrusions 16d are escaped sufficiently into the respective notches 11b so as to be prevented from projecting from the inner peripheries of the flanges 6b. Consequently, the coils 13 to 15 can be wound by effectively utilizing the radial dimension of each first insulated tooth 11 in the direction of projection thereof.

The axial depth D of each notch 11b is set to be five times or more the diameter of the magnet wire Wa. Accordingly, since the guide protrusions 16d of each former 17 are inserted axially deep into the respective notches 11b, the inner face of the escape groove 16c of the former 17 comes closer to the first insulated tooth 11. Accordingly, an amount of position control of the magnet wire by each former 17, which amount includes an amount of contact between the magnet wire and each former, a period of contact between them, etc., is increased. Consequently, since the magnet wire is accurately guided, the coils 13 to 15 wound on the first insulated teeth 11 can be rendered stable.

The parting line of the insulating end plates 8 and 9 is set along the bottom face of the notch 11b. This prevents occurrence of burrs in the circumferential side face of the flange 6. Thus, since a work for eliminating the burrs is not required, the manufacturing efficiency can be improved. There is a possibility that burrs occur in the bottom face of each notch 11b. However, the burrs are cut off by the guide protrusions 16d during the movement and consequently, the work for eliminating the burrs is not necessitated.

The depth D of each notch 11b is further set to be one half or more of the thickness Hc of each of the wound coils 13 to 15. Accordingly, the magnet wire is accurately guided since the guide protrusions 16d of each former 17 can be inserted deep into the notches 11b. Moreover, even when the eight Hc is increased with the increase in the number of layers of the coils 13 to 15, the inner face of the escape groove 16c can be caused to come closer to the coil surface of each first insulated tooth according to the height Hc because the notches 16b are relatively deep. Consequently, the magnet wire can accurately be guided.

The rising steps 6e and 7e are formed on the first and second insulated teeth 11 and 12 respectively. The rising height H of each of the rising steps 6e and 7e is set to be at least one half or more of the wire diameter of the coils 13 to 15 or the diameter R of the magnet wire. Consequently, the first turn of the magnet wire Wa of each of the coils 13 to 15 can be prevented from being pressed by the upper layers and thereby sliding to the inner circumferential side of the tooth.

Furthermore, the height H is set to be two times or less of the wire diameter at the maximum. Accordingly, when the guide plate 16e of the guide piece 16b is applied to the rising steps 6e and 7e so that the magnet wire is caused to fall to be located along the steps 6e and 7e, the guide plate 16e can be caused to come close to the first and second insulated teeth 11 and 12. Accordingly, the amount of position control of the magnet wire by each former 17 is increased. Consequently, since the magnet wire is accurately guided, the coils 13 to 15 wound on the first insulated teeth 11 can further be rendered stable.

The additional coils 13b to 15b and 13c to 15c are wound on the first insulated teeth 11 by utilizing the wide pole body 11a of each tooth. Thus, the number of turns can be increased by effectively using the dead space without an axial expansion of the coil side. Moreover, the motor output can be fine controlled by changing the number of turns of each of the additional coils.

Figure 19:
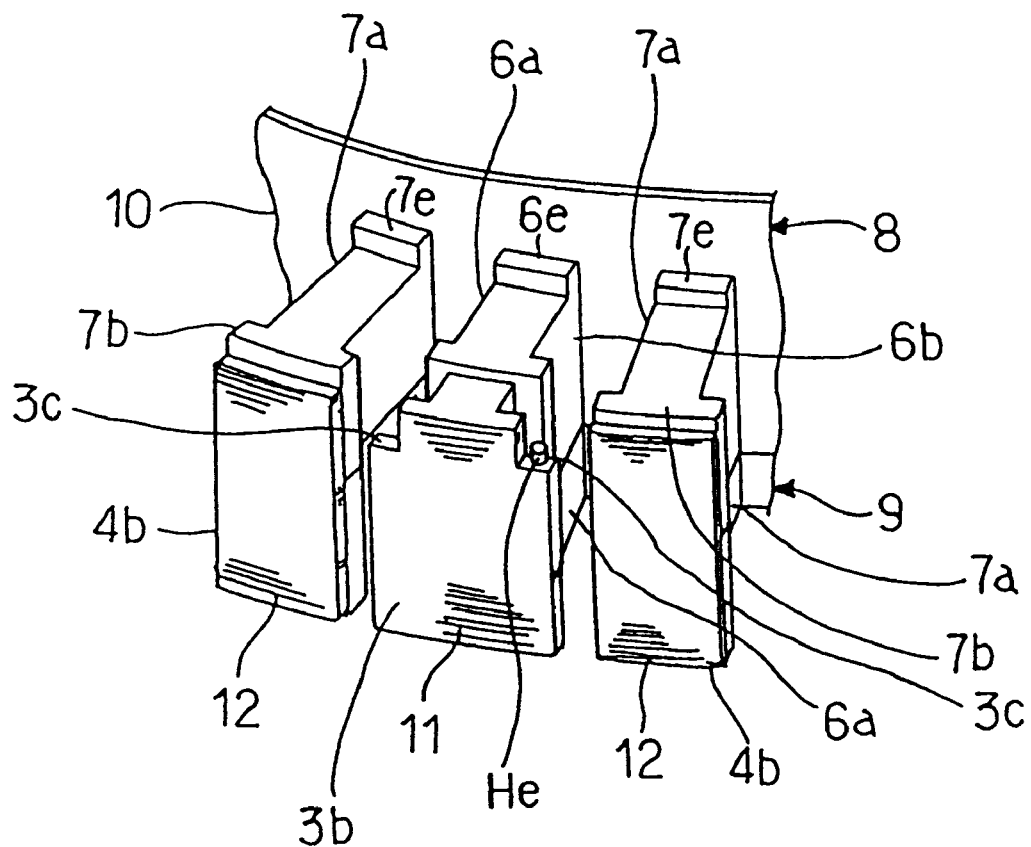
FIG. 19 is a perspective view of the first insulated teeth employed in the DC motor of a second embodiment in accordance with the present invention.
Figure 20:
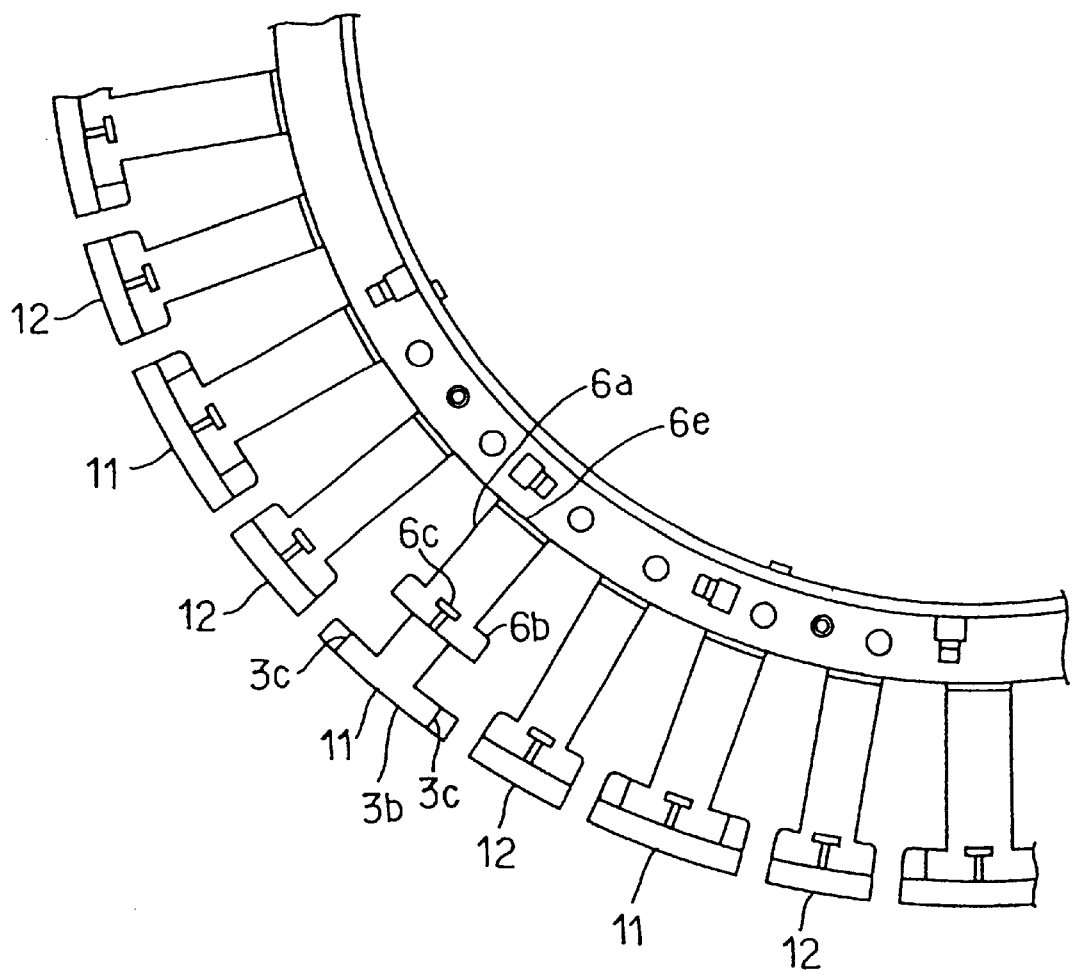
FIG. 20 is a partial top view of the stator with the coils being eliminated.

FIGS. 19 and 20 illustrate a second embodiment of the invention. The differences between the first and second embodiments will be described. The similar parts are labeled by the same reference symbols in the second embodiment as in the first embodiment. One of the first insulated teeth 11 on which the phase U coils 13 are wound respectively has notches 3c formed in the circumferential opposite ends of the pole section 3b thereof. Position detecting elements for detecting a rotational position of the rotor 29, for example, Hall elements, are provided in the notches 3c respectively. One of the Hall elements is schematically shown by reference symbol He in FIG. 19.

In the insulated tooth 11 provided with the Hall elements, the flanges 6a need to be spaced away from the notches in which the Hall elements are disposed. For this purpose, each of the tooth covers 6a for the tooth 11 with the notches has a length set to be smaller than the other tooth covers 6a and 7a. The number of turns of the phase U coil 13 wound on the insulated tooth 11 with the notches is set at 80 which is smaller than the number (=120 turns) of turns of the other coils. The first insulated teeth 11 other than that provided with the Hall elements are formed with the notches 11b only in the slot insulating section 6 as in the foregoing embodiment. The flange 6b of the slot insulating section 6a of the insulated tooth 11 provided with the Hall elements has the width equal to those of the other flanges 7c so that the escape groove 16c of the former 17 can pass the flange. As a result, the guide protrusions 16d can be located in notches 3c respectively.

According to the second embodiment, the Hall elements are disposed in the notches 3c of one of the first insulated teeth 11. Thus, the Hall elements can satisfactorily be disposed and can be prevented from projecting from the stator core 1. Consequently, the size of the motor can be prevented from being increased by the provision of the Hall elements. Furthermore, since the number of turns of the phase U coil 13 wound on the insulated tooth 11 provided with the Hall element is rendered smaller than that of the other insulated teeth 11. As a result, the Hall elements can be prevented from malfunction due to a magnetic field generated by the coil 13 on the tooth 11 with the Hall elements.

Figure 21:
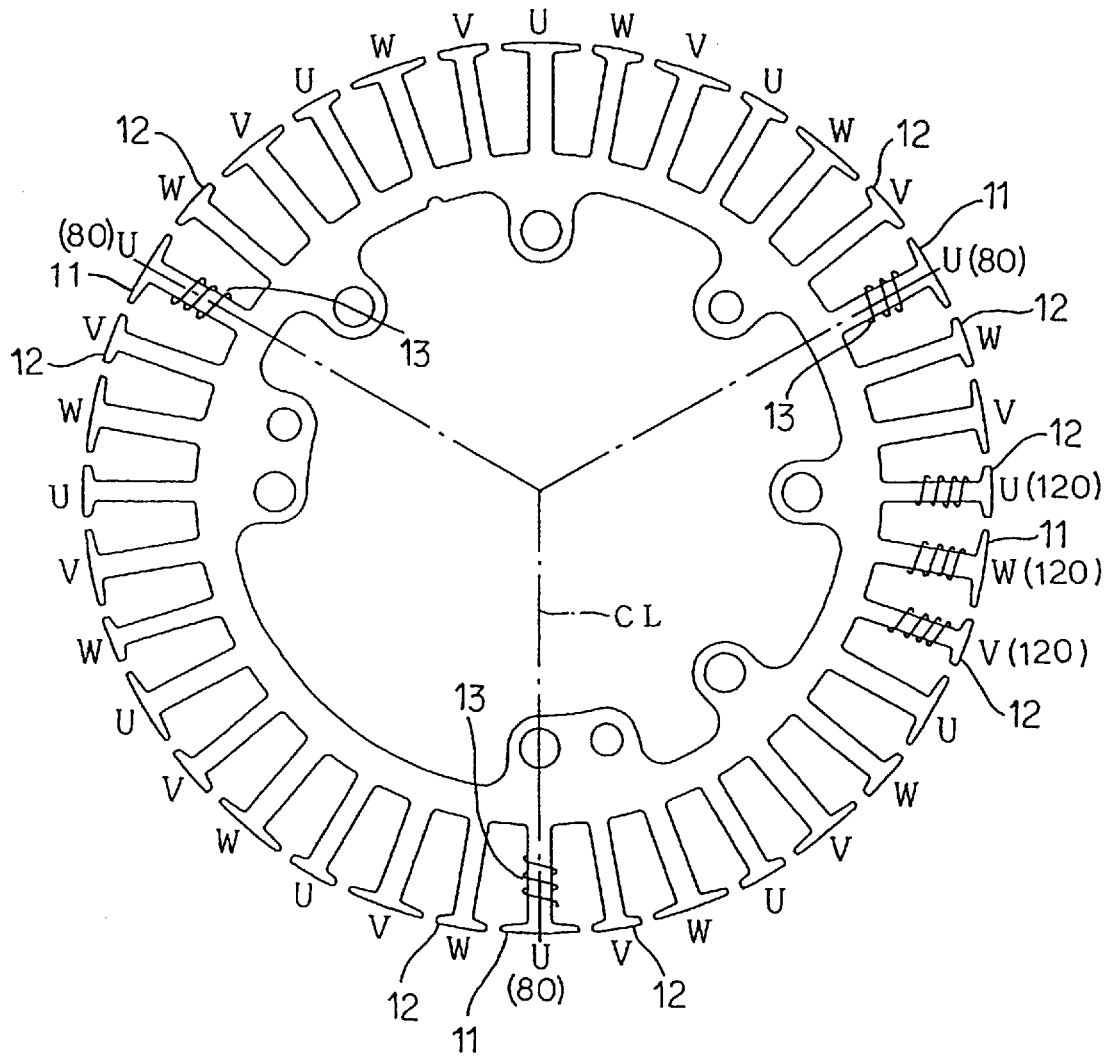
FIG. 21 schematically illustrates a winding manner in the DC motor of a third embodiment in accordance with the present invention.

FIG. 21 illustrates a third embodiment of the invention. The differences between the second and third embodiments will be described. The similar parts are labeled by the same reference symbols in the third embodiment as in the second embodiment. The insulating end plates 8 and 9 are eliminated for clarity in FIG. 21.

Three phase U coils 13 are spaced apart from one another by 120 degrees. The number of turns of each of these coils 13 is set at 80. The Hall elements are disposed in the first insulated tooth 11 on which one of the above-described coils 13 is wound or the teeth 11 on the center lines CL. The number of turns of the other phase U coils and all the phase V and W coils is 120.

According to the third embodiment, the first insulated teeth 11 belonging to the same phase as the tooth with the Hall elements are provided and having the smaller number of turns are disposed in a rotation symmetry. Magnetic forces from the phase U coils 13 applied to the rotor 29 are balanced. Since the magnetic unbalance is reduced in the same phase, oscillation and noise can be reduced.

Figure 22:
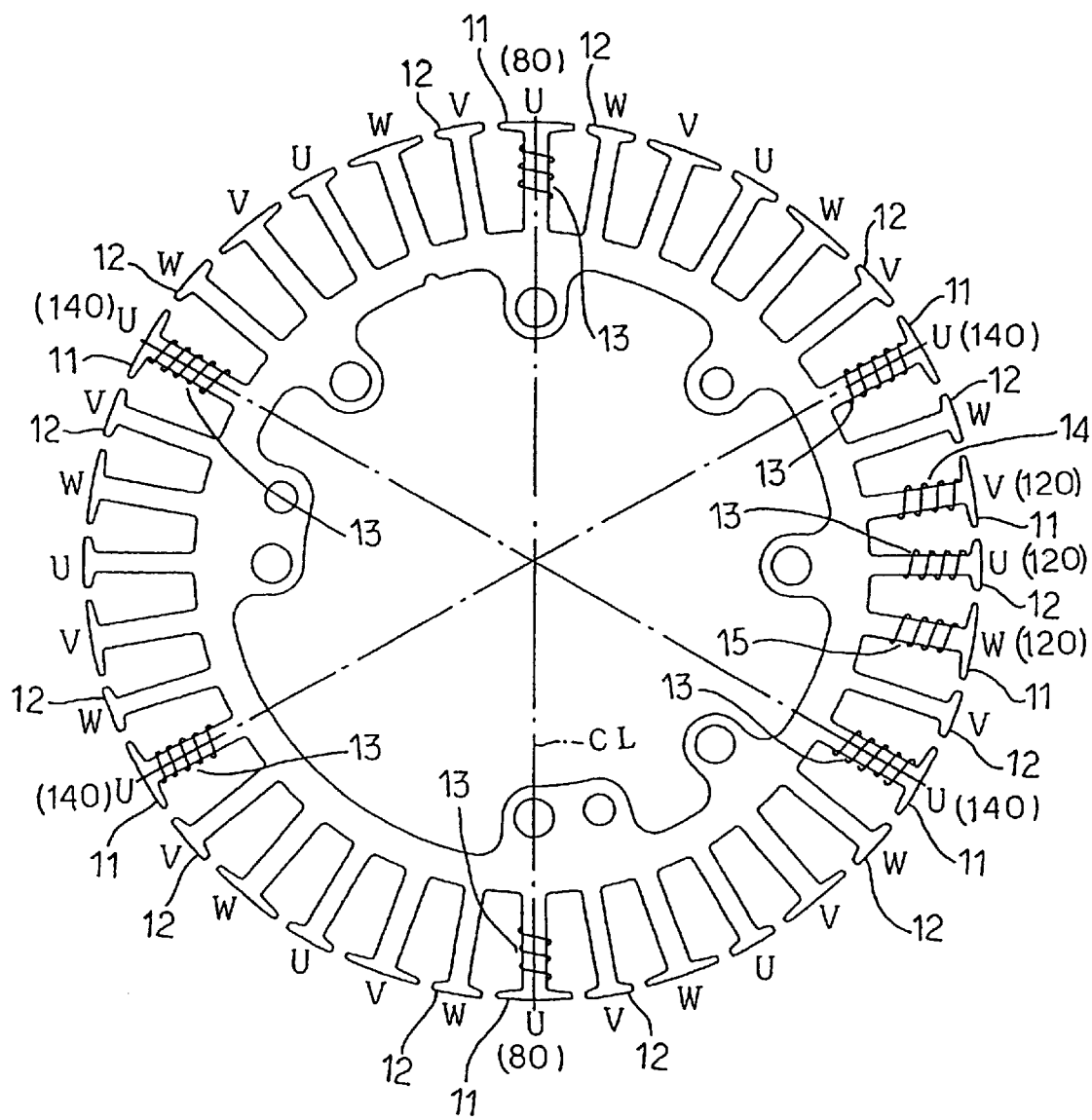
FIG. 22 is a view similar to FIG. 21, showing the DC motor of a fourth embodiment in accordance with the present invention.

FIG. 22 illustrates a fourth embodiment of the invention. The differences between the second and fourth embodiments will be described. The similar parts are labeled by the same reference symbols in the fourth embodiment as in the second embodiment. The number of turns of each of two phase U coils 13 is set at 80, and the number of turns of each of other four phase U coils 13 is set at 140. The other phase U coils 13 and all the phase V and W coils 14 and 15 are set at 120.

The phase U coils 13 of 80 turns are wound on the first insulated teeth 11 displaced by 180 degrees from the first insulated tooth provided with the Hall elements or the tooth on the center line CL. The phase U coils 13 of 140 turns are wound on the first insulated teeth 11 symmetric about the axis of the stator core 1. The total number of turns of the phase U coils 14 and 15 is set at 1440 (=80×2+140×4+120× 8). The total number of turns of each of the phase V and W coils 14 and 15 are set at 1440 (=120×12).

According to the fourth embodiment, the number of turns of each of the insulated teeth 11 other than the one with the Hall elements and belonging to the same phase as the one with the Hall elements are set at 120 and 140. The total number of turns of each phase coils is the same as each other. Magnetic forces from the phase coils 13 to 15 applied to the rotor 29 are balanced. Since the magnetic unbalance is reduced among different phases, the torque developed by each phase is equalized. Consequently, oscillation and noise can be reduced.

The phase U coil 13 is wound by 80 turns on the insulated tooth with which the first insulated tooth 11 with the Hall elements is disposed symmetrically. This further reduces the magnetic unbalance in each phase and accordingly, reduces the oscillation and noise. Furthermore, the phase U coils 13 are wound by 120 and 140 turns on the insulated teeth 11 to which the tooth of 80 turns is equiangularly disposed respectively. This further reduces the magnetic unbalance in each phase, reducing the oscillation and noise.

Figure 23:
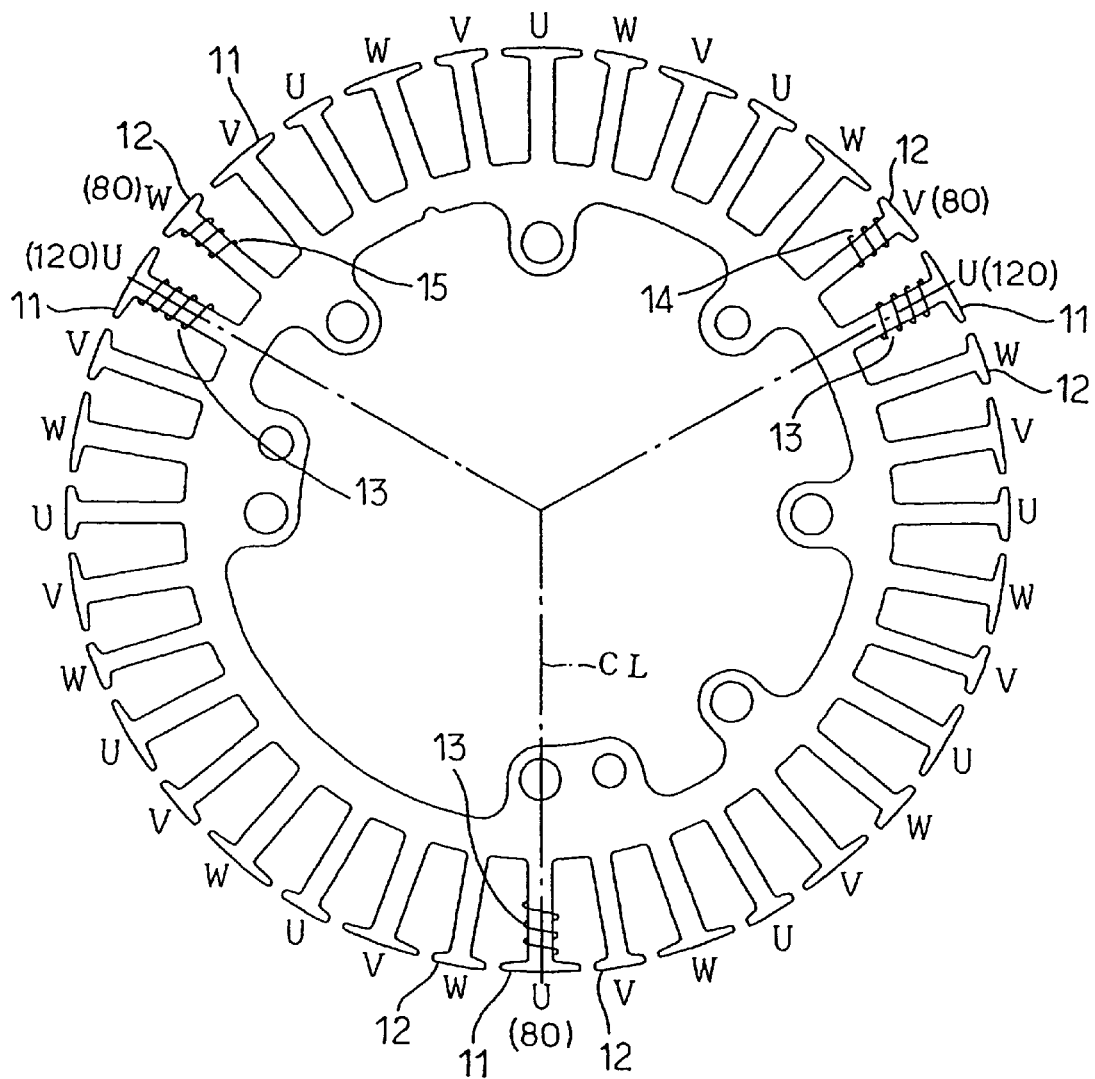
FIG. 23 is a view similar to FIG. 22, showing the DC motor of a fifth embodiment in accordance with the present invention.

FIG. 23 illustrates a fifth embodiment of the invention. The differences between the second and fifth embodiments will be described. The similar parts are labeled by the same reference symbols in the fifth embodiment as in the second embodiment. One of the phase V coils 14 and one of the phase W coils 15 spaced away from the above phase V coil 10 tooth pitches are each set at 80 turns. These phase V and W coils 14 and 15 are wound on the second insulated teeth 12 equiangularly disposed relative to the first insulated tooth which is provided with the Hall element and on which the coil is wound 80 turns (the lower insulated tooth 11 on the center line CL). Each of the other coils 13 to 15 is set at 120 turns.

According to the fifth embodiment, the insulated tooth 11 provided with the Hall elements and the two insulated teeth 12 belonging to the different phases and each having a smaller number of coil turns than the tooth with the Hall elements are disposed approximately in the symmetrical relation. This balances magnetic forces the phase coils 13 to 15 apply to the rotor 29. Since the torque developed by each phase is equalized, the oscillation and noise can further be reduced.

The number of turns of the tooth provided with the Hall elements and the number of turns of each of the two equiangularly disposed teeth belonging to the different phases are set at 80. Since the magnetic unbalance is reduced among different phases, the torque developed by each phase is equalized. Consequently, oscillation and noise can be reduced.

Figure 24:
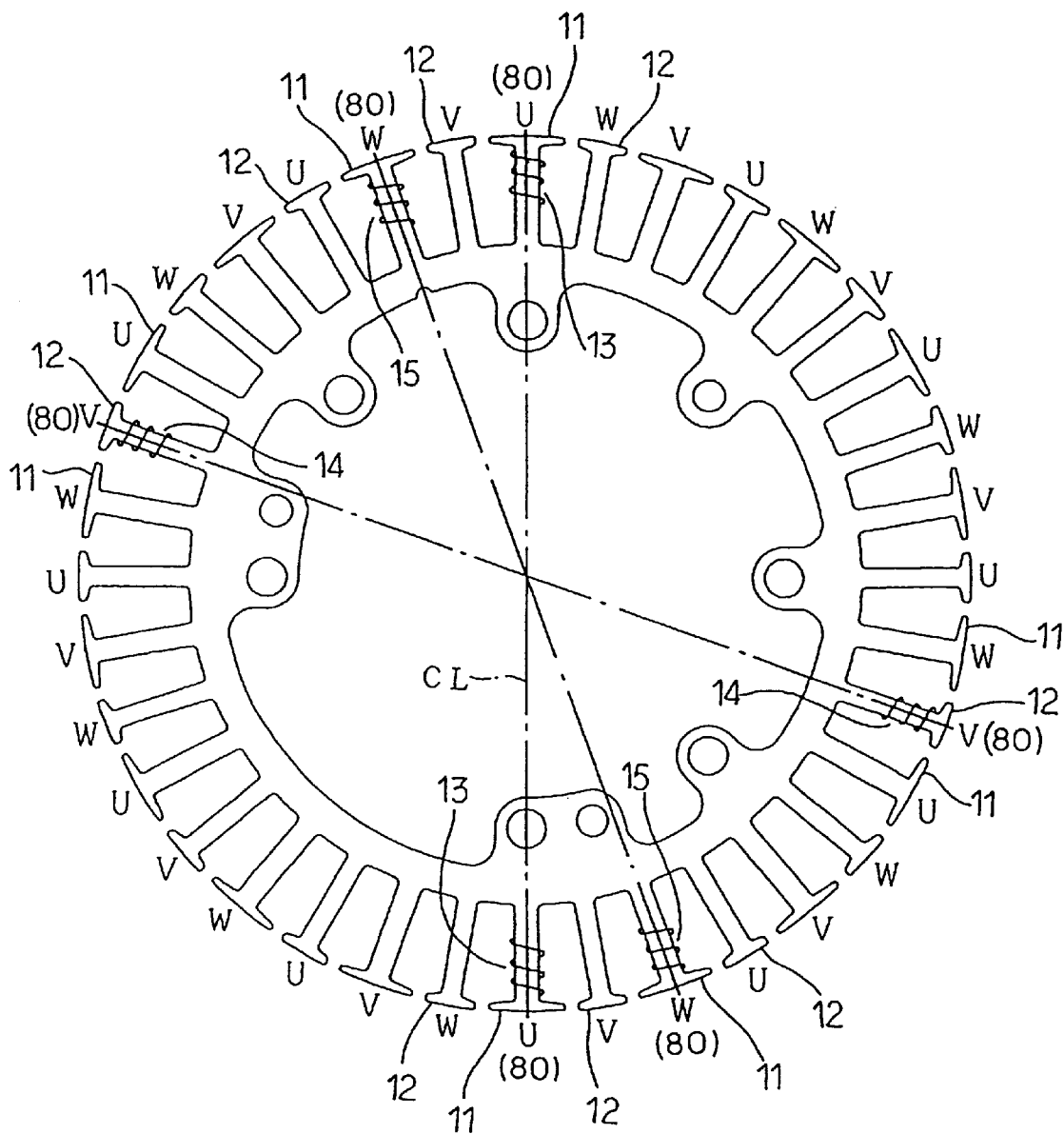
FIG. 24 is a view similar to FIG. 23, showing the DC motor of a sixth embodiment in accordance with the present invention.

FIG. 24 illustrates a sixth embodiment of the invention. The differences between the second and sixth embodiments will be described. The similar parts are labeled by the same reference symbols in the sixth embodiment as in the second embodiment. The number of turns of two of the phase U coils 13 is set at 80. These phase U coils 13 are wound on the insulated tooth 11 provided with the Hall elements (lower insulated tooth 11 on the center line CL in FIG. 24) and the insulated tooth 11 spaced 180 degrees away from the tooth with the Hall elements, respectively. The number of turns of the other phase U coils 13 is set at 120.

The number of turns of two of the phase V coils 14 is set at 80. These phase V coils 14 are wound on two second insulated teeth 12 spaced 180 degrees away from each other. The number of turns of the other phase V coils 14 is set at 120. The number of turns of two of the phase W coils 15 is set at 80. These phase W coils 15 are wound on two first insulated teeth 11 spaced 180 degrees away from each other. The number of turns of the other phase W coils 15 is set at 120.

According to the sixth embodiment, the Hall elements are provided in one of the insulated teeth 11 and a plurality of insulated teeth 11 and 12 are provided belonging to the different phases and having the smaller number of turns. These insulated teeth 11 and 12 are disposed symmetrically about the center of rotation for every one phase. This balances the magnetic forces the phase coils 13 to 15 apply to the rotor 29. Since the magnetic unbalance is reduced among different phases, the torque developed by each phase is equalized. Consequently, oscillation and noise can be reduced.

Furthermore, the number of turns is set at 80 regarding the first insulated tooth 11 provided with the Hall elements, the insulated tooth 11 disposed 180 degrees away from the tooth with the Hall elements and belonging to the same phase, and insulated teeth 12 spaced 180 degrees away from each other and belonging to the different phases. Since the magnetic unbalance is reduced among different phases, the oscillation and noise can further be reduced.

Figure 25:
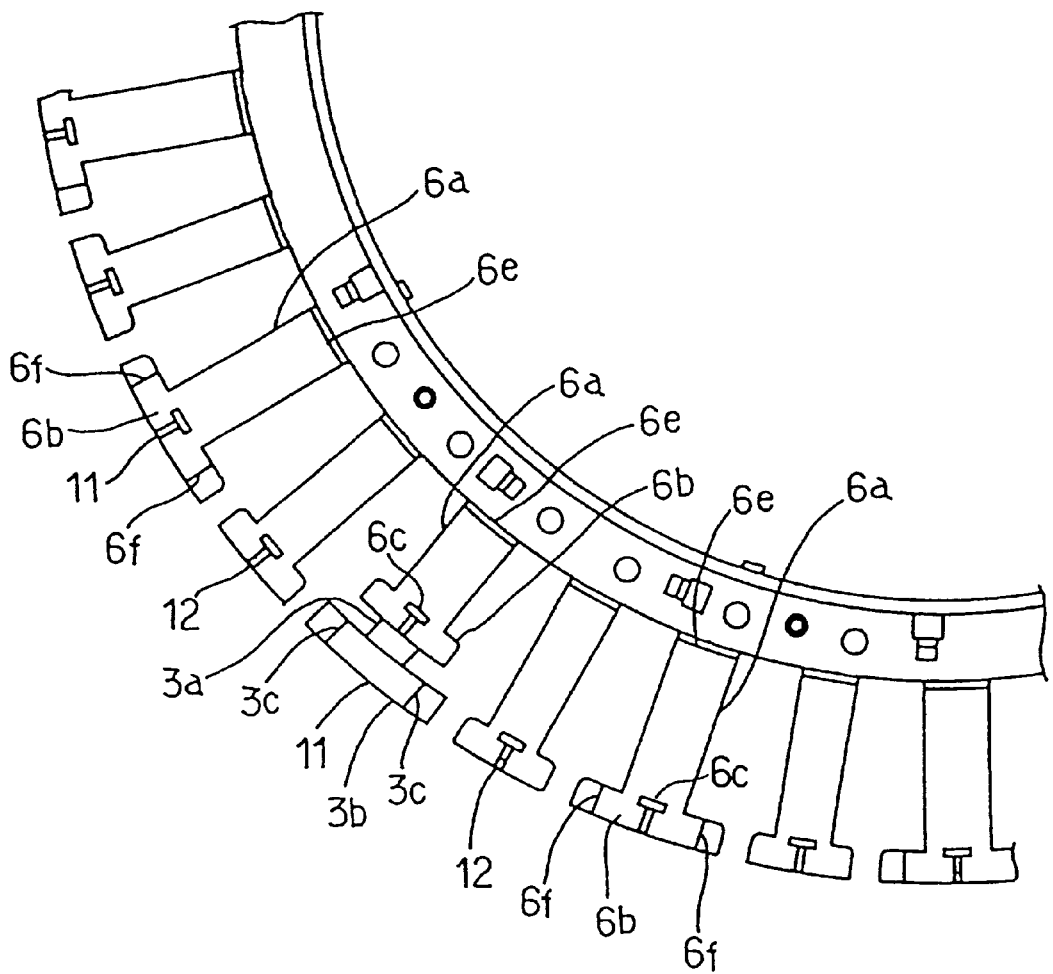
FIG. 25 is a view similar to FIG. 20, showing the DC motor of a seventh embodiment in accordance with the present invention.

In the second to sixth embodiments, the notches 11b are provided only in the slot insulating section 6 of each of the first insulated teeth 11 not provided with the Hall elements. However, as shown as a seventh embodiment in FIG. 25, the notches as shown by reference symbol "3c" in FIG. 19 may be formed in four corners of each wide pole section 3b, and each flange 6b may be formed so as to be fitted with the periphery of the portion of the pole section 3b where the notches are located, instead. Reference symbol 6f in FIG. 25 designates recesses of the flange 6bcorresponding to the notches of the pole section 3b. In this construction, the protrusions 16d of the former 17 are escaped into the recesses 6f of the flange 6b when the coils 13 to 15 are wound on the first insulated teeth 11.

In the first to sixth embodiments, the notches 11b are formed in all the corners of each slot insulating section 6 regarding the first insulated teeth 11 in which no Hall element is provided. The notch or notches 11b may be formed in one, two and three of the corners, instead. Particularly in the case where the notches are formed in two corners, the magnet wire can stably be wound when the notches are disposed diagonally. When one notch is formed in the arrangement of FIG. 18, for example, the notch 11b may be formed in the right-hand corner at the upper face side and in the left-hand corner at the lower face side of each insulated tooth 11 so that the notches correspond to the direction in which the magnet wire is wound.

Each of the coils 13 to 15 is wound into four layers in the first to seventh embodiments. However, each coil may be wound into one to three layers or five or more layers.

Each of the coils 13 to 15 is wound into a regular or normal winding in the foregoing embodiment. However, each coil may be wound into a random coil, instead. Furthermore, each of the coils 13 to 15 should not be limited to the pyramidal or trapezoidal shape.

The total number of teeth of the stator core 1 is set at 36 in the foregoing embodiments. The number may be set at any value provided that the number of teeth per phase is at or above 2. In particular, the pole of each phase is preferably set at an even number.

Although the additional coils 13b to 15b and 13c to 15c are wound on the first insulated teeth in the foregoing embodiments, the additional coils may or may not be provided. Although the additional coils are wound into the regular or normal winding in the foregoing embodiments, each of them may be wound into the random coil, instead.

In the foregoing embodiments, the insulating end plates 8 and 9 are attached to the stator core 1, and the coils 13 to 15 are wound on the slot insulating sections 6 and 7. For example, however, the stator core 1 may be formed by the insert molding so as to be covered with the slot insulating sections, and the coils 13 to 15 may be wound on the slot insulating sections. Furthermore, the insulating end plates 8 and 9 may be eliminated, and a sufficiently insulated magnet wire may be wound directly on the teeth 3 and 4 to form the coils 13 to 15. In this arrangement, the notches are directly formed in the circumferential corners of each pole section 3b.

The width W1a of the coil-winding section 3a of each first tooth 3 differs from the width W2a of the coil-winding section 4a of each second tooth 4 in the foregoing embodiments. However, the widths W1a and W2a may be approximately the same, instead.

The invention is applied to the stator for the brushless DC motor of the outer rotor type in the foregoing embodiments. However, the invention may be applied to stators for brushless DC motors of the inner rotor type, stators for DC motors of the outer rotor type with respective brushes, stators for DC motors of the inner rotor type with respective brushes, rotors for DC motors of the outer rotor type with respective brushes, and rotors for DC motors of the inner rotor type with respective brushes.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A direct-current motor comprising:
    a core including a plurality of teeth arranged in a circular disposition and defining a plurality of slots, the teeth having distal ends and coil-winding sections respectively;
    slot insulating members disposed to cover outer peripheries of the teeth respectively;
    coils wound on the coil-winding sections of the teeth with the slot insulating members being interposed therebetween, respectively; and
    pole sections, each pole section provided at a distal end side of a corresponding tooth and is circumferentially wider than a corresponding coil-winding sections;
    wherein the teeth include first teeth having wider pole sections respectively and second teeth having pole sections narrower than the first teeth; and
    wherein the slot insulating members have notches in portions thereof located at circumferential corners of the pole sections of the first teeth respectively.

2. The motor of claim 1, wherein a parting line of each slot insulating member extends along a side of each notch approximately perpendicular to a direction of axis.

3. The motor of claim 1, wherein each of the first and second teeth has a rising step formed of an insulating material and located at an end opposite to an opening of the slot so as to rise from a side of the coil winding section, and each rising step has a rising height one half or more of and twice or less as large as a wire diameter of each coil.

4. The motor of claim 1, wherein the coils are wound on the first and second teeth by a winding machine provided with guide protrusions reciprocally movable lengthwise with respect to each tooth to thereby guide the first and second teeth to a location where a coil forming magnet wire is wound thereon, and each notch has such a shape for receiving therein the corresponding guide protrusion at a receiving position thereof.

5. The motor of claim 1, wherein the notches are formed in each pole section in a diagonal disposition.

6. The motor of claim 1, wherein the first and second teeth have outer peripheries covered with the slot insulating members respectively, and the notches are formed in portions of the slot insulating members of each first tooth, the portions corresponding to all the corners located at both circumferential ends of each pole section respectively.

7. The motor of claim 1, wherein a portion of the pole section of each first tooth excluding the notches has a circumferential width approximately equal to a width of the pole section of each second tooth.

8. The motor of claim 1, wherein each notch has an axial depth fives times or more as large as a wire diameter of each coil.

9. The motor of claim 1, wherein the coils are wound on the respective first teeth into a regular winding, and each notch has an axial depth one half or more of a thickness of the coil wound on each first tooth.

10. The motor of claim 1, wherein each coil is wound on the corresponding first tooth into a regular winding for forming into a trapezoidal shape, and an additional coil is wound on each first tooth to be located between a coil end and the pole section.

11. The motor of claim 1, wherein a position detecting element is provided in one of the notches of one of the first teeth, and the coil wound on said one first tooth has a smaller number of turns than the other coils.

12. A direct-current motor comprising:
    a core including a plurality of teeth arranged in a circular disposition and defining a plurality of slots, the teeth having distal ends and coil-winding sections respectively;
    coils wound on the coil-winding sections of the teeth respectively; and
    pole sections, each pole section provided at a distal end side of a corresponding tooth and is circumferentially wider than a corresponding coil-winding section;
    wherein the teeth include first teeth having wider pole sections respectively and second teeth having pole sections narrower than the first teeth; and
    wherein notches are formed in circumferential corners of the pole sections of the first teeth.

13. The motor of claim 12, wherein the coils are wound on the first and second teeth by a winding machine provided with guide protrusions reciprocally movable lengthwise with respect to each tooth to thereby guide the first and second teeth to a location where a coil forming magnet wire is wound thereon, and each notch has such a shape as to receive therein the corresponding guide protrusion at a reversing position thereof.

14. The motor of claim 13, wherein each notch has a width with respect to a direction of projection of each tooth, said width being equal to or larger than a circumferential dimension of each guide protrusion.

15. The motor of claim 12, wherein the notches are formed in each pole section in a diagonal disposition.

16. The motor of claim 12, wherein the first and second tooth have outer peripheries covered with slot insulating members respectively, and the notches are formed in portions of the slot insulating members of each first teeth, the portions corresponding to all the corners located at both circumferential ends of each pole section respectively.

17. The motor of claim 12, wherein a portion of the pole section of each first tooth excluding the notches has a circumferential width approximately equal to a width of the pole section of each second tooth.

18. The motor of claim 12, wherein each notch has an axial depth five times or more as large as a wire diameter of each coil.

19. The motor of claim 12, wherein the coils are wound on the respective first teeth into a regular winding, and each notch has an axial depth one half or more of a thickness of the coil wound on each first tooth.

20. The motor of claim 12, wherein each coil is wound on the corresponding first tooth into a regular winding so as to be formed into a trapezoidal shape, and an additional coil is wound on each first tooth to be located between a coil end and the pole section.

21. The motor of claim 1, wherein a position detecting element is provided in one of the notches of one of the first teeth, and the coil wound on said one of the first teeth has a smaller number of turns than the other coils.

22. The motor of claim 21, wherein the coils are wound the same number of turns on said one of the first teeth provided with the position detecting element and another one of the first teeth belonging to the same phase as said one of the first teeth and disposed approximately symmetrically with said one of the first teeth, respectively.

23. The motor of claim 21, wherein said one of the first teeth provided with the position detecting element at least in one phase and the other teeth in said one phase are set at a larger number of turns so that a total number of turns in said one phase is equal to a total number of turns in each of the other phases.

24. The motor of claim 21, wherein at least one tooth has a smaller number of turns of the coil than the other teeth, said at least one tooth belonging to a phase differing from a phase to which said one first tooth provided with the position detecting element belongs, said at least one tooth being disposed approximately symmetrically with said one first tooth provided with the position detecting element.

25. The motor of claim 21, wherein the teeth include the first or second teeth each of which belongs to a phase differing from a phase of said one of the first teeth provided with the position detecting element and each of which has a smaller number of turns of the coil than said one of the first teeth provided with the position detecting element, said first or second teeth being disposed approximately symmetrically with each other in each phase.

26. The motor of claim 25, wherein the coils disposed approximately symmetrically in each phase and each having the smaller number of turns than the other teeth have the respective numbers of turns approximately equal to the number of turns of the coils wound on the first tooth provided with the position detecting element.

* * * * *